(12) United States Patent
Peng et al.

(10) Patent No.: US 12,034,532 B2
(45) Date of Patent: Jul. 9, 2024

(54) METHODS, APPARATUS AND SYSTEMS FOR TRANSMITTING DATA BASED ON POLAR CODE

(71) Applicant: ZTE Corporation, Guangdong (CN)

(72) Inventors: Focai Peng, Guangdong (CN); Jun Xu, Guangdong (CN); Jin Xu, Guangdong (CN); Mengzhu Chen, Guangdong (CN); Xuan Ma, Guangdong (CN); Saijin Xie, Guangdong (CN); Cuihong Han, Guangdong (CN)

(73) Assignee: ZTE Corporation, Guangdong (CN)

( * ) Notice: Subject to any disclaimer, the term of this patent is extended or adjusted under 35 U.S.C. 154(b) by 343 days.

(21) Appl. No.: 17/488,872

(22) Filed: Sep. 29, 2021

(65) Prior Publication Data

US 2022/0021479 A1  Jan. 20, 2022

Related U.S. Application Data

(63) Continuation of application No. PCT/CN2019/080529, filed on Mar. 29, 2019.

(51) Int. Cl.
*H04L 1/00* (2006.01)

(52) U.S. Cl.
CPC .......... *H04L 1/0057* (2013.01); *H04L 1/0009* (2013.01)

(58) Field of Classification Search
None
See application file for complete search history.

(56) References Cited

U.S. PATENT DOCUMENTS

| 2016/0277156 A1 | 9/2016 | Bayesteh et al. |
| 2020/0052819 A1* | 2/2020 | Xu .......... H03M 13/13 |
| 2020/0092039 A1* | 3/2020 | Wang .......... H04L 1/0036 |

FOREIGN PATENT DOCUMENTS

| CN | 105075163 A | 11/2015 |
| CN | 106464446 A | 2/2017 |
| CN | 108540259 A | 9/2018 |
| CN | 108886438 A | 11/2018 |
| CN | 108933643 A | 12/2018 |
| WO | WO 2007/091327 A1 | 8/2007 |
| WO | WO 2017/133580 A1 | 8/2017 |
| WO | WO 2018/031777 A1 | 2/2018 |
| WO | WO 2018/202080 A1 | 11/2018 |
| WO | WO 2018/214927 A1 | 11/2018 |

OTHER PUBLICATIONS

Office Action received for China Patent Application No. 201980095038.2 dated Jan. 10, 2023 (English and Chinese languages) (8 pages).

(Continued)

*Primary Examiner* — Minh Trang T Nguyen
(74) *Attorney, Agent, or Firm* — Crowell & Moring LLP

(57) ABSTRACT

Wireless transmission of data may be based on Polar code. The wireless communication may include selecting a coding scheme between a first coding scheme and a second coding scheme. The first coding scheme is based on a first Polar code, while the second coding scheme is based on the first Polar code and a second Polar code. An information packet is encoded based on the coding scheme and transmitted.

19 Claims, 17 Drawing Sheets

(56) References Cited

OTHER PUBLICATIONS

Huawei et al., "HARQ Scheme For Polar Codes", 3GPP TSG RAN WG1 Meeting #87, R1-1611255, Agenda 7.1.5.1, 3rd Generation Partnership Project (3GPP), Mobile Competence Centre; 650, Route Des Lucioles; F-06921 Sophia-Antipolis Cedex; France, vol. RAN WG1 Meeting #87, Reno, Nevada, USA; Nov. 14, 2016-Nov. 18, 2016, Nov. 14-18, 2016 (25 pp.).

Nokia et al., "Downlink Channel Interleaver for Polar codes", 3GPP TSG RAN WG1 #90bis, R1-1718678, Agenda Item 7.4.2.2, 3$^{rd}$ Generation Partnership Project (3GPP), Mobile Competence Centre; 650, Route Des Lucioles; F-06921 Sophia-Antipolis Cedex; France, vol. RAN WGI, no. Prague, CZ; Oct. 9, 2017-Oct. 13, 2017, Oct. 9-13, 2017 (4 pp.).

Office Action dated Jun. 20, 2022 for China Patent Application No. 201980095038.2 (7 pages).

Extended European Search Report received for Application No. EP 19922920.4 dated Oct. 20, 2022 (10 pages).

Nokia Alcatel-Lucent Shanghai Bell, "Further Discussion on IR HARQ for Polar Codes", 3GPP TSG-RAN WG1 #87, R1-1613017, Agenda 7.1.5.1, 3rd Generation Partnership Project (3GPP), Mobile Competence Centre; 650, Route Des Lucioles; F-06921 Sophia-Antipolis Cedex ; France, vol. RAN WGL, No. Reno, U.S.A.; Nov. 14, 2016-Nov. 18, 2016, Nov. 14-18, 2016 (6 pp.).

International Search Report and Written Opinion received for Application No. PCT/CN2019/080529 dated Jan. 6, 2020 (6 pages).

Huawei et al., "Channel coding for URLLC; R1-1720759" *3GPP TSG RAN WG1 Meeting 91*, Dec. 1, 2017, section 2-3 (16 pages).

MediaTek Inc., "Discussion on Polar Code Design and Performance; R1-165165" *3GPP TSG RAN WG1 Meeting #85bis*, May 27, 2016, sections 1-3 (8 pages).

Office Action received for Japan Patent Application No. 2021-557687 dated Apr. 25, 2023 (English and Japanese languages) (25 pages).

ZTE, ZTE Microelectronics, HARQ Performance of Rate-compatible Polar codes [online], 3GPP TSG RAN WG1 #87 R1-1613267, Internet <URL:http://www.3gpp.org/ftp/tsg_ran/WG1_RL1/TSGR1_87/Docs/R1-1613267.zip>, Nov. 18, 2016 (9 pp.).

Huawei, HiSilicon, HARQ scheme for polar codes [online], 3GPP TSG RAN WG1 Meeting #87 R1-1611255, Internet <URL:http://www.3gpp.org/ftp/tsg_ran/WG1_RL1/TSGR1_87/Docs/R1-1611255.zip>, Nov. 18, 2016 (26 pp.).

Li et al., "Capacity-achieving rateless polar codes", 2016 IEEE International Symposiumon Information Theory (ISIT), Jul. 2016, DOI: 10.1109/ISIT.2016.7541258 (5 pp.).

* cited by examiner

METHODS, APPARATUS AND SYSTEMS FOR TRANSMITTING DATA BASED ON POLAR CODE

PRIORITY

This application claims priority as a Continuation of PCT/CN2019/080529, filed on Mar. 29, 2019, entitled "Methods, apparatus and systems for transmitting a data flow with multiple automatic repeat request processes", published as WO 2020/198976 A1, the entire disclosure of which is hereby incorporated by reference.

TECHNICAL FIELD

The disclosure relates generally to wireless communications and, more particularly, to methods, apparatus and systems for wirelessly transmitting data based on Polar code.

BACKGROUND

The fourth Generation mobile communication technology (4G) Long-Term Evolution (LTE) or LTE-Advance (LTE-A) and the fifth Generation (5G) new radio (NR) mobile communication technology face more and more demands. In an existing NR radio access network, the Polar code has been applied to the encoding of physical downlink control channel (PDCCH), physical broadcast channel, and uplink control information. The above channels and information are not retransmitted currently. Therefore, they do not need hybrid automatic repeat request (HARQ) technology. Based on an existing Polar code, K information bits are encoded into N bits based on a mother code length N. Then a sub-block interleaving is performed on the N bits. Then E bits are selected based on the N bits by shortening, puncturing, or repetition, where E is the number of bits after rate matching and is also the number of bits carried by the resource.

In future application scenarios of NR, such as ultra-reliable low-latency communication (URLLC) and massive machine-type communication (mMTC), channels for transmitting data, e.g. physical downlink shared channel (PDSCH) and physical uplink shared channel (PUSCH), may use Polar codes as their channel coding schemes. That is, Polar codes may need to be combined with HARQ technology. However, within a 5G-NR system, there is no existing method for performing HARQ transmissions (including retransmission, new transmission, encoding, decoding, etc.) based on a Polar code.

SUMMARY OF THE INVENTION

The exemplary embodiments disclosed herein are directed to solving the issues relating to one or more of the problems presented in the prior art, as well as providing additional features that will become readily apparent by reference to the following detailed description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

In one embodiment, a method performed by a transmitter module in a wireless communication system is disclosed. The method comprises: selecting a coding scheme between a first coding scheme and a second coding scheme, wherein the first coding scheme is based on a first Polar code, wherein the second coding scheme is based on the first Polar code and a second Polar code; encoding an information packet based on the coding scheme; and transmitting the encoded information packet.

In another embodiment, a method performed by a receiver module in a wireless communication system is disclosed. The method comprises: receiving an encoded information packet; and decoding the encoded information packet based on at least one Polar code. Decoding the encoded information packet comprises: decoding a first part of the encoded information packet to obtain first decoded data, and decoding a second part of the encoded information packet to obtain second decoded data. Decoding the second part comprises updating the second decoded data based on the first decoded data.

In a different embodiment, a wireless communications apparatus is disclosed. The wireless communications apparatus comprises a processor and a memory, wherein the processor is configured to read code from the memory and implement a method recited in some embodiment. In yet another embodiment, a computer program product is disclosed. The computer program product comprises a computer-readable program medium code stored thereupon, the code, when executed by a processor, causing the processor to implement a method in some embodiment.

The above and other aspects and their implementations are described in greater detail in the drawings, the descriptions, and the claims.

BRIEF DESCRIPTION OF THE DRAWINGS

Various exemplary embodiments of the present disclosure are described in detail below with reference to the following Figures. The drawings are provided for purposes of illustration only and merely depict exemplary embodiments of the present disclosure to facilitate the reader's understanding of the present disclosure. Therefore, the drawings should not be considered limiting of the breadth, scope, or applicability of the present disclosure. It should be noted that for clarity and ease of illustration these drawings are not necessarily drawn to scale.

DETAILED DESCRIPTION OF EXEMPLARY EMBODIMENTS

Figure 1:
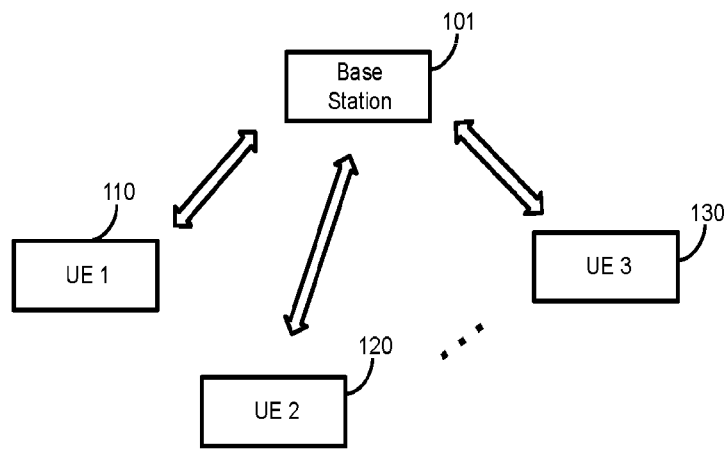
FIG. 1 illustrates an exemplary communication network in which techniques disclosed herein may be implemented, in accordance with an embodiment of the present disclosure.

Various exemplary embodiments of the present disclosure are described below with reference to the accompanying figures to enable a person of ordinary skill in the art to make and use the present disclosure. As would be apparent to those of ordinary skill in the art, after reading the present disclosure, various changes or modifications to the examples described herein can be made without departing from the scope of the present disclosure. Thus, the present disclosure is not limited to the exemplary embodiments and applications described and illustrated herein. Additionally, the specific order and/or hierarchy of steps in the methods disclosed herein are merely exemplary approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

A typical wireless communication network includes one or more base stations (typically known as a "BS") that each provides geographical radio coverage, and one or more wireless user equipment devices (typically known as a "UE") that can transmit and receive data within the radio coverage. In the wireless communication network, a BS and a UE can communicate with each other via a communication link, e.g., via a downlink radio frame from the BS to the UE or via an uplink radio frame from the UE to the BS.

The present teaching proposes methods for encoding and decoding data based on Polar codes. In one example, a first coding scheme based on a first Polar code is selected to encode an information packet. In another example, a second coding scheme based on the first Polar code and a second Polar code is selected to encode an information packet. The selection may be based on one or more parameters like: a redundancy version, a transmission number, a code rate, a code length, a length of the information packet, a link direction, a channel type, a downlink control information format, a search space, a scrambling mode, and a terminal capability. A transmitter module, which may be BS or UE, can transmit the encoded information packet to a receiver module, which may be BS or UE.

For example, the first coding scheme may be selected when: a current transmission is a new transmission; a code rate is greater than or equal to a code rate threshold; a mother Polar code length is less than or equal to a mother Polar code length threshold; the link direction is downlink; or the channel type is a physical control channel. The second coding scheme may be selected when: a current transmission is a first retransmission; a code rate is less than the code rate threshold; a mother Polar code length is greater than the mother Polar code length threshold; the link direction is uplink; or the channel type is a physical downlink shared channel or a physical uplink shared channel.

After the receiver module receives an encoded information packet, the receiver module can decode the encoded information packet based on at least one Polar code. For example, the receiver module may first decode a first part of the encoded information packet to obtain first decoded data, and then decode a second part of the encoded information packet to obtain second decoded data. Decoding the second part comprises updating the second decoded data based on the first decoded data.

In various embodiments, a BS may be referred to as a network side node and can include, or be implemented as, a next Generation Node B (gNB), an E-UTRAN Node B (eNB), a Transmission Reception Point (TRP), an Access Point (AP), a donor node (DN), a relay node, a core network (CN) node, a RAN node, a master node, a secondary node, a distributed unit (DU), a centralized unit (CU), etc. A UE in the present disclosure can be referred to as a terminal and can include, or be implemented as, a mobile station (MS), a station (STA), etc. A BS and a UE may be described herein as non-limiting examples of "wireless communication nodes" or "wireless communication modules"; and a UE may be described herein as non-limiting examples of "wireless communication devices." The BS and UE can practice the methods disclosed herein and may be capable of wireless and/or wired communications, in accordance with various embodiments of the present disclosure.

FIG. 1 illustrates an exemplary communication network 100 in which techniques disclosed herein may be implemented, in accordance with an embodiment of the present disclosure. As shown in FIG. 1, the exemplary communication network 100 includes a base station (BS) 101 and a plurality of UEs, UE 1 110, UE 2 120 . . . UE 3 130, where the BS 101 can communicate with the UEs according to wireless protocols. A transmitter module, e.g. the BS 101, may use a retransmission scheme to ensure transmission reliability to a receiver module, e.g. a UE. That is, after the BS 101 performs a new transmission to the UE, the BS 101 may perform a retransmission to the UE on at least part of the data in the new transmission. In this example, both the data in the new transmission and the data in the retransmission can be encoded using Polar codes. In one embodiment, data in the new transmission are encoded based on a first Polar code, while data in the retransmission are encoded based on both the first Polar code and a second Polar code.

Figure 2:
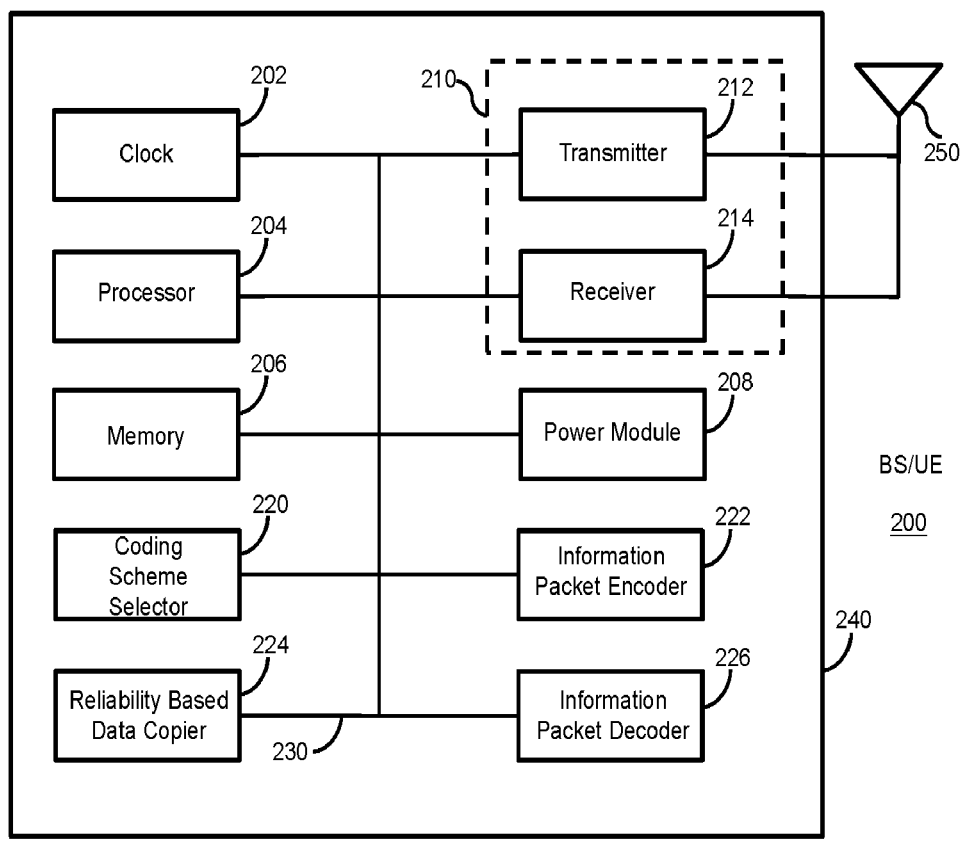
FIG. 2 illustrates a block diagram of a base station (BS) and/or a user equipment (UE), in accordance with some embodiments of the present disclosure.

FIG. 2 illustrates a block diagram of a node 200, which may be a base station (BS) and/or a user equipment (UE), in accordance with some embodiments of the present disclosure. The node 200 is an example of a module or device that can be configured to implement the various methods described herein. As shown in FIG. 2, the node 200 includes a housing 240 containing a system clock 202, a processor 204, a memory 206, a transceiver 210 comprising a transmitter 212 and receiver 214, a power module 208, a coding scheme selector 220, an information packet encoder 222, a reliability based data copier 224, and an information packet decoder 226.

In this embodiment, the system clock 202 provides the timing signals to the processor 204 for controlling the timing of all operations of the node 200. The processor 204 controls the general operation of the node 200 and can include one or more processing circuits or modules such as a central processing unit (CPU) and/or any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable circuits, devices and/or structures that can perform calculations or other manipulations of data.

The memory 206, which can include both read-only memory (ROM) and random access memory (RAM), can provide instructions and data to the processor 204. A portion of the memory 206 can also include non-volatile random access memory (NVRAM). The processor 204 typically performs logical and arithmetic operations based on program instructions stored within the memory 206. The instructions (a.k.a., software) stored in the memory 206 can be executed by the processor 204 to perform the methods described herein. The processor 204 and memory 206 together form a processing system that stores and executes software. As used herein, "software" means any type of instructions, whether referred to as software, firmware, middleware, microcode, etc. which can configure a machine or device to perform one or more desired functions or processes. Instructions can include code (e.g., in source code format, binary code format, executable code format, or any other suitable format of code). The instructions, when executed by the one or more processors, cause the processing system to perform the various functions described herein.

The transceiver 210, which includes the transmitter 212 and receiver 214, allows the node 200 to transmit and receive data to and from a remote device (e.g., the BS or another UE). An antenna 250 is typically attached to the housing 240 and electrically coupled to the transceiver 210. In various embodiments, the node 200 includes (not shown) multiple transmitters, multiple receivers, and multiple transceivers. In one embodiment, the antenna 250 is replaced with a multi-antenna array 250 that can form a plurality of beams each of which points in a distinct direction. The transmitter 212 can be configured to wirelessly transmit packets having different packet types or functions, such packets being generated by the processor 204. Similarly, the receiver 214 is configured to receive packets having different packet types or functions, and the processor 204 is configured to process packets of a plurality of different packet types. For example, the processor 204 can be configured to determine the type of packet and to process the packet and/or fields of the packet accordingly.

In a wireless communication, the node 200 may serve either as a transmitter module or as a receiver module. In one scenario when serving as a transmitter module, the coding scheme selector 220 of the node 200 may select a coding scheme between a first coding scheme and a second coding scheme. The first coding scheme is based on a first Polar code. The second coding scheme is based on the first Polar code and a second Polar code. In one embodiment, the coding scheme is selected based on at least one parameter selected from the group of: a redundancy version, a transmission number, a code rate, a code length, a length of the information packet, a link direction, a channel type, a downlink control information format, a search space, a scrambling mode, and a terminal capability. The coding scheme selector 220 may inform the information packet encoder 222 about the selected coding scheme.

The coding scheme may be selected to be the first coding scheme under at least one condition selected from the group of: a current redundancy version is a first redundancy version RV 0; a current transmission is a new transmission; a current transmission is a first transmission; a current transmission is an odd number of transmission; a code rate $R \geq R0$, wherein R0 is a code rate threshold; a mother Polar code length $N \leq N0$, wherein N0 is a mother Polar code length threshold; a length of the information packet to be encoded is $K < K0$, wherein K0 is a length threshold of the information packet to be encoded; a link direction is downlink; a channel type is a physical control channel; a downlink control information format is format 0_0 or format 1_0; a search space is a cell-specific search space; a scrambling mode is scrambling based on a cell radio network temporary identifier; and a terminal capability supports rate matching in a limited buffer. The coding scheme may be selected to be the second coding scheme under at least one condition selected from the group of: a current redundancy version is a second redundancy version RV 1; a current transmission is a first retransmission; a current transmission is a second transmission; a current transmission is an even number of transmission; a code rate $R < R0$, wherein R0 is a code rate threshold; a mother Polar code length $N > N0$, wherein N0 is a mother Polar code length threshold; a length of the information packet to be encoded is $K \geq K0$, wherein K0 is a length threshold of the information packet to be encoded; a link direction is uplink; a channel type is a physical downlink shared channel or a physical uplink shared channel; a downlink control information format is a format other than format 0_0 and format 1_0; a search space is a user-specific search space; a scrambling mode is scrambling using a radio network temporary identifier other than a cell radio network temporary identifier; and a terminal capability does not support rate matching in a limited buffer.

Based on the coding scheme selected by the coding scheme selector 220, the information packet encoder 222 in this example may encode an information packet to generate an encoded information packet; and transmit, via the transmitter 212, the encoded information packet to a receiver module in the communication system. In one embodiment, the coding scheme is selected to be the second coding scheme, and encoding the information packet comprises: encoding the information packet based on the first Polar code to generate a first output; encoding the information packet based on the second Polar code to generate a second output; and performing a modulo-2 addition operation or an exclusive OR operation on the first output and the second output to obtain a codeword. In one example, encoding the information packet further comprises at least one operation selected from the group of: concatenating the codeword with the first output to generate the encoded information packet; concatenating the codeword with the second output to generate the encoded information packet; and concatenating the first output with the second output to generate the encoded information packet.

For the second coding scheme, the reliability based data copier 224 in this example may copy P bits to be encoded in the second Polar code from P bits in the first Polar code. In one example, the P bits in the first Polar code correspond to data carried by P sub-channels with worst reliability. In another example, the P bits to be encoded in the second Polar code correspond to data carried by P sub-channels with best reliability.

In one embodiment, the number P of copied bits is related to at least one selected from the group of: a number K of bits to be encoded, a mother Polar code length N, a number E of bits after rate matching, a code rate R=K/E, and a mother code rate K/N. In one embodiment, the number P of copied bits is determined based on a table. In another embodiment, the number P of copied bits is determined based on different formulas according to different code rates, respectively. In one example, when a current transmission is a third transmission or a fourth transmission, numbers of sub-channels carrying the copied bits are within numbers of codeword bits of the third transmission. The information packet encoder 222 may utilize the copied bits from the reliability based data copier 224 to encode the data.

In one embodiment, the information packet encoder 222 may encode the information packet by generating a codeword with a length 2N at one time, where N is a mother code length of the first Polar code and the second Polar code. For example, generating the codeword comprises: offsetting an original sequence with a length N by N to generate an offset sequence; and combining the offset sequence with the original sequence to generate the codeword with the length 2N. In one embodiment, P bits in a first half of the information packet to be encoded are same as P bits in a second half of the information packet to be encoded. In another embodiment, a sub-block interleaving pattern used in a first half of the codeword with the length 2N becomes a sub-block interleaving pattern used in a second half of the codeword after an offset N.

In another scenario, the node 200 serves as a receiver module. In this scenario, the information packet decoder 226 receives, via the receiver 214, an encoded information packet, e.g. from a transmitter module. The information packet decoder 226 can decode the encoded information packet based on at least one Polar code. In one embodiment, decoding the encoded information packet comprises: decoding a first part of the encoded information packet to obtain first decoded data, and decoding a second part of the encoded information packet to obtain second decoded data. Decoding the second part may comprise updating the second decoded data based on the first decoded data.

In one embodiment, the first decoded data correspond to data on sub-channels of a retransmission. In another embodiment, the first decoded data correspond to data on sub-channels of a second transmission. In one embodiment, the second decoded data correspond to data copied from sub-channels of a new transmission. In another embodiment, the second decoded data correspond to data copied from sub-channels of a second transmission.

Each of the first decoded data and the second decoded data may comprise information related to: hard bits, log likelihood ratio, and/or decoding probability. In one embodiment, updating the second decoded data comprises: replacing values of hard bits of the second decoded data with values of hard bits of the first decoded data. In another embodiment, updating the second decoded data comprises: replacing a log likelihood ratio of the second decoded data with a log likelihood ratio of the first decoded data. In yet another embodiment, updating the second decoded data comprises: replacing a decoding probability of the second decoded data with a decoding probability of the first decoded data. In still another embodiment, updating the second decoded data comprises: adding, according to a certain proportion, a log likelihood ratio of the second decoded data and a log likelihood ratio of the first decoded data to generate a sum; and replacing the log likelihood ratio of the second decoded data with the sum.

In one embodiment, updating the second decoded data comprises: based on a determination that the first decoded data represent a hard bit "0", replacing a log likelihood ratio of the second decoded data with an absolute value of the log likelihood ratio itself; and based on a determination that the first decoded data represent a hard bit "1", replacing the log likelihood ratio of the second decoded data with a negative absolute value of the log likelihood ratio itself. In another embodiment, updating the second decoded data comprises: based on a determination that a log likelihood ratio of the first decoded data is greater than or equal to 0, replacing a log likelihood ratio of the second decoded data with an absolute value of the log likelihood ratio of the second decoded data itself; and based on a determination that the log likelihood ratio of the first decoded data is less than 0, replacing the log likelihood ratio of the second decoded data with a negative absolute value of the log likelihood ratio of the second decoded data itself.

The power module 208 can include a power source such as one or more batteries, and a power regulator, to provide regulated power to each of the above-described modules in FIG. 2. In some embodiments, if the node 200 is coupled to a dedicated external power source (e.g., a wall electrical outlet), the power module 208 can include a transformer and a power regulator.

The various modules discussed above are coupled together by a bus system 230. The bus system 230 can include a data bus and, for example, a power bus, a control signal bus, and/or a status signal bus in addition to the data bus. It is understood that the modules of the node 200 can be operatively coupled to one another using any suitable techniques and mediums.

Although a number of separate modules or components are illustrated in FIG. 2, persons of ordinary skill in the art will understand that one or more of the modules can be combined or commonly implemented. For example, the processor 204 can implement not only the functionality described above with respect to the processor 204, but also implement the functionality described above with respect to the information packet encoder 222. Conversely, each of the modules illustrated in FIG. 2 can be implemented using a plurality of separate components or elements.

Figure 3:
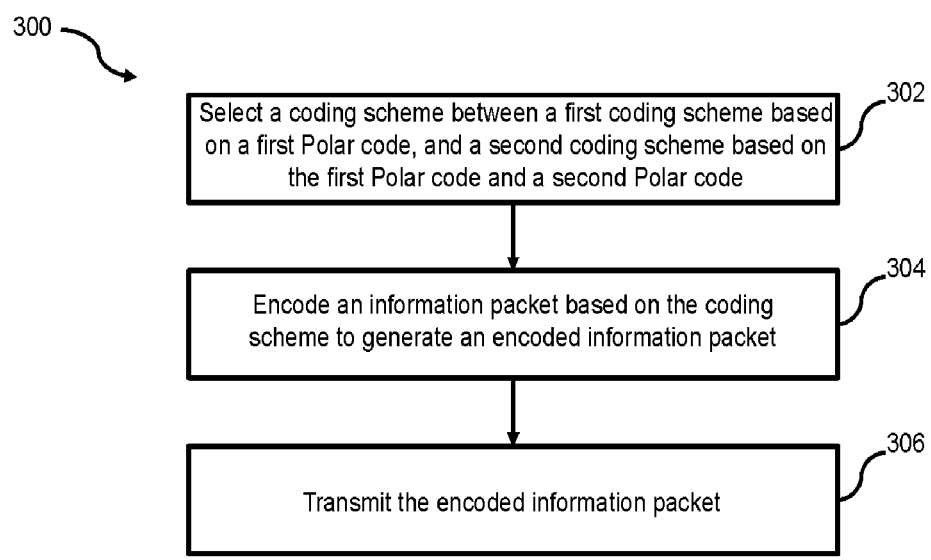
FIG. 3 illustrates a flow chart for a method performed by a BS or a UE for wirelessly transmitting data based on Polar code, in accordance with some embodiments of the present disclosure.

FIG. 3 illustrates a flow chart for a method 300 performed by a wireless communication node, e.g. the node 200 in FIG. 2, for wirelessly transmitting data based on Polar code as a transmitter module, in accordance with some embodiments of the present disclosure. At operation 302, a coding scheme is selected between a first coding scheme based on a first Polar code, and a second coding scheme based on the first Polar code and a second Polar code. At operation 304, an information packet is encoded based on the coding scheme to generate an encoded information packet. At operation 306, the encoded information packet is transmitted to a receiver module. The order of the operations shown in FIG. 3 may be changed according to different embodiments of the present disclosure.

Figure 4:
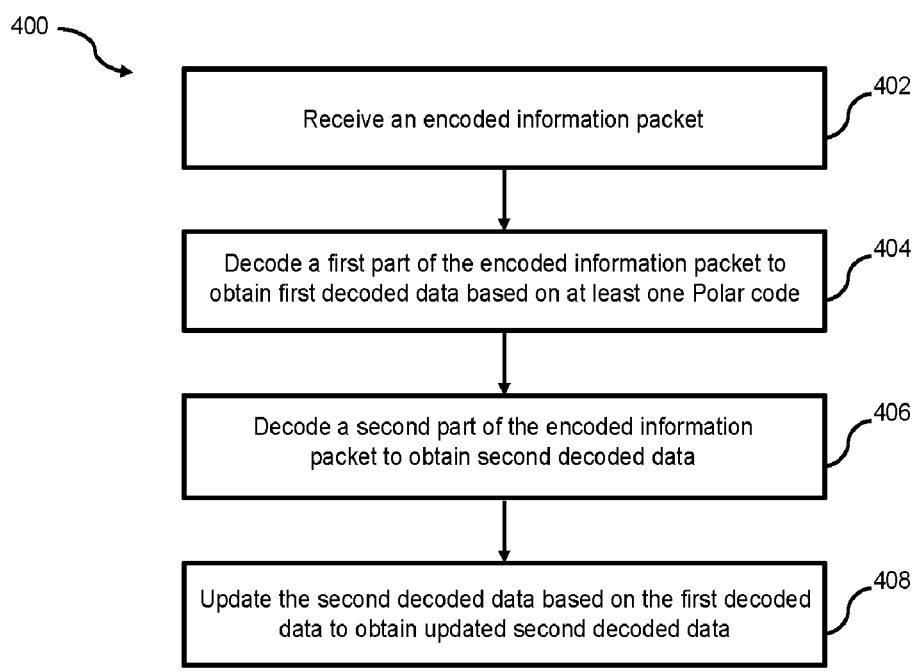
FIG. 4 illustrates a flow chart for a method performed by a BS or a UE for receiving and decoding data based on Polar code, in accordance with some embodiments of the present disclosure.

FIG. 4 illustrates a flow chart for a method 400 performed by a wireless communication node, e.g. the node 200 in FIG. 2, receiving and decoding data based on Polar code as a receiver module, in accordance with some embodiments of the present disclosure. At operation 402, an encoded information packet is received. At operation 404, a first part of the encoded information packet is decoded to obtain first decoded data based on at least one Polar code. At operation 406, a second part of the encoded information packet is decoded to obtain second decoded data. At operation 408, the second decoded data is updated based on the first decoded data to obtain updated second decoded data. The order of the operations shown in FIG. 4 may be changed according to different embodiments of the present disclosure.

Different embodiments of the present disclosure will now be described in detail hereinafter. It is noted that the features of the embodiments and examples in the present disclosure may be combined with each other in any manner without conflict.

The present teaching proposes methods and systems for encoding and decoding data based on Polar codes. A first embodiment is disclosed based on the following exemplary parameters: the information length K=120 bits (K also included cyclic redundancy check (CRC) if there is a CRC), the length of the Polar code mother code N=256, the number of bits after rate matching (i.e., the number of bits that the resource can carry) E=200 bits, using two times of transmission (i.e., retransmission one time), each transmission uses the same E resource bits, P=floor $((((R)/a)*E/B)^2+(((R)/A)^2*E/C))$=14 bits are copied during the retransmission, where R=K/E=120/200=3/5, A=563/1024=0.55, B=280, C=17, floor( ) is the floor function that takes as input a real number x and gives as output the greatest integer less than or equal to x, and $(\ )^2$ is the square operation.

Figure 5:
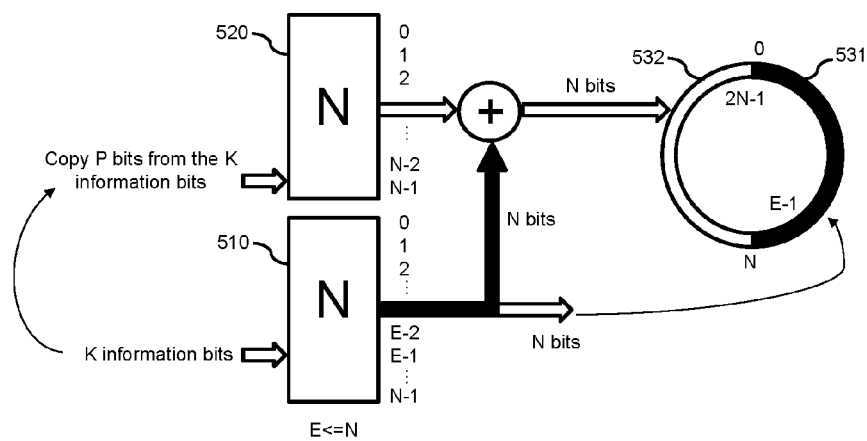
FIG. 5 illustrates an exemplary encoding method based on Polar code, in accordance with some embodiments of the present disclosure.

FIG. 5 illustrates an exemplary encoding method based on Polar code, in accordance with some embodiments of the present disclosure. Since the code rate R>7/16, the embodiment uses a shortening scheme to encode during the first transmission (i.e. the new transmission). That is, the last N−E codeword bits after sub-block interleaving will be known "0" so that these codeword bits with known values are not transmitted.

The encoding in the new transmission is performed in accordance with a conventional Polar code 510 as shown in the lower half of FIG. 5. After the encoding is completed (including sub-block interleaving), N codeword bits are written into the first N bits 531 of a circular buffer with length 2N. In one example, according to the Polar code sequence, for the new transmission, numbers of the sub-channels carrying the K information bits are {89, 141, 31, 147, 72, 162, 46, 101, 52, 149, 47, 76, 105, 163, 54, 194, 153, 78, 165, 55, 84, 58, 113, 136, 79, 195, 86, 59, 169, 140, 100, 87, 61, 90, 197, 142, 102, 148, 177, 143, 32, 91, 150, 103, 106, 164, 93, 48, 151, 154, 166, 107, 56, 114, 155, 80, 109, 167, 196, 60, 170, 115, 157, 88, 198, 117, 171, 62, 178, 92, 199, 173, 121, 63, 144, 104, 179, 94, 108, 181, 152, 95, 156, 110, 185, 116, 168, 158, 111, 118, 172, 159, 119, 174, 122, 200, 180, 175, 123, 64, 182, 125, 183, 186, 96, 187, 112, 189, 160, 120, 176, 124, 184, 126, 188, 127, 190, 191, 128, 192}. All sub-channels were numbered starting from 1. The above sub-channels are ranked according to their reliabilities, from worst reliability to best reliability. Other sub-channels are set to frozen bit "0". The transmitting end transmits the E=200 codeword bits in the first half of the circular buffer after the sub-block is interleaved.

For retransmission, first, P=14 bits from sub-channels with the worst sub-channel reliability are copied from the newly transmitted K information bits, and put into the retransmission data to transmit through the Polar code 520, as shown in the upper part of FIG. 5. In one example, the P sub-channels with worst reliability have numbers of {89, 141, 31, 147, 72, 162, 46, 101, 52, 149, 47, 76, 105, 163}, ranked according to their reliabilities, from worst reliability to best reliability.

The retransmission may use the same encoding scheme as the new transmission. Here, the retransmission also uses the shortening scheme. That is, the new transmission and the retransmission use the same sequence, the same sub-block interleaving, and the same puncturing pattern. Then, during retransmission, numbers of the sub-channels carrying P information bits are {112, 189, 160, 120, 176, 124, 184, 126, 188, 127, 190, 191, 128, 192}, arranged according to their reliabilities, from worst reliability to best reliability. Other sub-channels are set to frozen bits "0". For simplicity of description, it is assumed that the copies of the data have a one-to-one correspondence. That is, data of the sub-channel 112 of the retransmission is copied from the sub-channel 89 of the new transmission; data of the sub-channel 189 of the retransmission is copied from the sub-channel 141 of the new transmission; and so on and so forth. As such, data can be copied from the P=14 sub-channels. The copying of the data may also be in another corresponding order, so long as the receiving end knows the corresponding order of the copying.

After the encoding for retransmission is completed (including sub-block interleaving), a XOR operation (or modulo 2 addition) may be performed on the encoded data with respect to the newly transmitted N codeword bits to obtain N codeword bits after the XOR operation. Then, the N codeword bits are written into the second N bits 532 of the circular buffer with length 2N, as shown in FIG. 5.

The transmitting end transmits E=200 codeword bits stored in the latter half of the circular buffer after XOR. Here, it is assumed that both new transmission and retransmission use E=200 bit resources to transmit. In case that the retransmission uses less resources, e.g., only resources with EE=160 bits can be used, the transmitting end should select the latter EE=160 bits to transmit based on the above E=200 codeword bits. That is, the former E−EE=200−160=40 bits need to be discarded. That is, it is selected from the E−EE+1=200−160+1=40+1=41 bit until the E=200 bits. That is, the selected bit numbers are E−EE+1 to E, where the numbering starts from 1. That is, the numbers of the selected bits in the buffer are N+E−EE+1 to N+E, wherein the numbering starts from 1.

In case that the retransmission uses more resources, e.g. EEE=270 bits of resources can be used, the transmitting end can circularly select from the buffer the EEE−E=270−200=70 bits transmitted in the new transmission to transmit, in addition to the transmission of the above E=200 codeword bits. The transmitting end may also select EEE−E=270−200=70 bits from the above E=200 codeword bits to transmit. For example, the selection may start from a codeword bit with a relatively small number to codeword bits with relatively large numbers, or start from a codeword bit with a relatively large number to codeword bits with relatively small numbers.

The receiving end can decode the new transmission. After receiving the newly transmitted E=200 data, the receiving end needs to initialize the N−E=256−200=56 data that has not been transmitted into +∞ or a large positive number, such as +10000. This gives N−E+E=56+200=N=256 data bits (i.e., soft bits). Thereafter, the receiving end performs sub-block de-interleaving on the N=256 data to obtain N=256 data. Then, the receiving end decodes N=256 data after the sub-block de-interleaving.

In the first embodiment, the shortening method is used here. That is, after encoding, these codeword bits are known to be "0". In the following second embodiment that uses the method of puncturing, the receiving end initializes the N−E=256−200=56 data that has not been transmitted into 0 rather than a large positive number.

If the decoding is unsuccessful, the receiving end waits for the transmitter to retransmit data. After receiving the retransmitted E=200 data, the receiving end needs to initialize the N−E=256−200=56 data that has not been transmitted into +∞ or a large positive number, such as +10000. This results in N−E+E=56+200=N=256 data of the retransmission. After that, the receiving end performs sub-block de-interleaving on the N=256 data, and obtains N=256 data after the sub-block de-interleaving.

The receiving end concatenates the N=256 data bits after the sub-block de-interleaving in the retransmission with the N=256 data bits after the sub-block de-interleaving in the new transmission to obtain 2N=2*256=512 data bits. During the concatenation, the newly transmitted data is arranged in front, i.e. having large index numbers e.g. from N+1 to 2N; while the retransmitted data is arranged later, i.e. having small index numbers e.g. from 1 to N.

The receiving end uses 2N=512 Polar code decoder to decode. First, the decoder will decode the data on P=14 sub-channels, based on: e.g. hard bits, log likelihood ratio (LLR) before hard decision, decoding probability, probability of decoding to "0", probability of decoding to "1", etc. Hard bits refer to regular bits "0" and "1". In this embodiment, the decoder first decodes data on 14 sub-channels of {112, 189, 160, 120, 176, 124, 184, 126, 188, 127, 190, 191, 128, 192}. Next, when the decoder decodes data on 14 sub-channels of {89, 141, 31, 147, 72, 162, 46, 101, 52, 149, 47, 76, 105, 163}+N={345, 397, 287, 403, 328, 418, 302, 357, 308, 405, 303, 332, 361, 419}, the decoder replaces or combines data on the 14 sub-channels of {345, 397, 287, 403, 328, 418, 302, 357, 308, 405, 303, 332, 361, 419} using the data on the 14 sub-channels of {112, 189, 160, 120, 176, 124, 184, 126, 188, 127, 190, 191, 128, 192} based on a one-to-one correspondence. That is, the data on sub-channel 345 will be replaced or combined by the data on sub-channel 112, the data on sub-channel 397 will be replaced or combined by the data on sub-channel 189, and so on and so forth, to finish the replacement or combination operation on the data of the P=14 sub-channel s.

When the data of the sub-channels is replaced or combined, if data on the 14 sub-channels of {112, 189, 160, 120, 176, 124, 184, 126, 188, 127, 190, 191, 128, 192} are hard bits, then based on these hard bits, data on the 14 sub-channels of {345, 397, 287, 403, 328, 418, 302, 357, 308, 405, 303, 332, 361, 419} can be replaced directly, or an LLR on the 14 sub-channels of {345, 397, 287, 403, 328, 418, 302, 357, 308, 405, 303, 332, 361, 419} can be corrected. For example, if the data for sub-channel 112 is a hard bit "0," then the LLR on sub-channel 345 will be replaced with its own absolute value, i.e. LLR=abs (LLR), where abs ( ) is an operation that takes an absolute value; if the data of sub-channel 112 is a hard bit "1," then the LLR on sub-channel 345 will be replaced with its own negative absolute value, i.e. LLR=−abs (LLR).

If data on the 14 sub-channels of {112, 189, 160, 120, 176, 124, 184, 126, 188, 127, 190, 191, 128, 192} are LLRs, then based on these LLRs, LLRs on the 14 sub-channels of {345, 397, 287, 403, 328, 418, 302, 357, 308, 405, 303, 332, 361, 419} can be replaced directly, be combined, or be corrected. For example, if the LLR of sub-channel 112 is LLR112 and the LLR of sub-channel 345 is LLR345, then the replacement operation means LLR345=LLR112; the combination operation may mean LLR345=α*LLR112+(1−α)*LLR345, wherein a may be e.g. 0.9; the correction operation means: if LLR112≥0, then LLR345=abs (LLR345), otherwise, LLR345=−abs (LLR345).

If data on the 14 sub-channels of {112, 189, 160, 120, 176, 124, 184, 126, 188, 127, 190, 191, 128, 192} are decoding probabilities, comprising a probability of decoding to "0" and a probability of decoding to "1", then based on these decoding probabilities, decoding probabilities on the 14 sub-channels of {345, 397, 287, 403, 328, 418, 302, 357, 308, 405, 303, 332, 361, 419} can be replaced, combined, or corrected. For example, if a probability of decoding to "0" on the sub-channel 112 is P0_112, a probability of decoding to "1" on the sub-channel 112 is P1_112, a probability of decoding to "0" on the sub-channel 345 is P0_345, and a probability of decoding to "1" on the sub-channel 345 is P1_345, then the replacement operation means P0_345=P0_112 and P1_345=P1_112; the combination operation may mean P0_345=P0_345*P0_112 and P1_345=P1_345*P1_112; the correction operation may mean the following. If P0_112≥P1_112, then it is to execute: Temp=P0_345, P0_345=max (P0_345, P1_345), and P1_345=min (Temp, P1_345); otherwise, it is to execute: Temp=P0_345, P0_345=min (P0_345, P1_345) and P1_345=max (Temp, P1_345), where max ( ) takes the larger of the two numbers, and min ( ) takes the smaller of the two numbers. The decoder then decodes the other subsequent sub-channels.

In addition, it is also possible that the retransmitted data and the newly transmitted data are not concatenated, which eliminates the code length limitation of the decoder. First, the received E=200 data in the new transmission are recovered to N=256 data, e.g. by initializing each un-transmitted data into a large positive number. Then sub-block de-interleaving is performed to obtain N=256 data F256. Then, the received E=200 data in the retransmission are recovered to N=256 data, and sub-block de-interleaving is performed to obtain N=256 data R256. A box-plus (i.e., tan h$^{-1}$( ) or inverse hyperbolic tangent) is performed on the new transmission data F256 after the sub-block de-interleaving and the retransmission data R256 after the sub-block de-interleaving, to obtain N=256 data corresponding to the retransmission. The N=256 data corresponding to the retransmission are decoded to obtain data on the P=14 sub-channels of {112, 189, 160, 120, 176, 124, 184, 126, 188, 127, 190, 191, 128, 192}, wherein the obtained data may refer to hard bits or LLRs. For simplicity of description, it is assumed here that hard bits are obtained.

The P=14 hard bits are encoded with a Polar code of length N=256, to obtain N=256 codeword bits S256, wherein the P=14 hard bits are carried on the P=14 sub-channels {112, 189, 160, 120, 176, 124, 184, 126, 188, 127, 190, 191, 128, 192}, and the other sub-channels are all set to the frozen bit "0".

A g function is performed on the N=256 data F256 of new transmission and the N=256 data R256 of retransmission, to obtain N=256 data C256. The g function may be C256=F256+(1−2*S256)*R256, wherein the "+", "−" and "*" are individual operations of addition, subtraction, and multiplication for each element of the array.

Thereafter, the N=256 data C256 are decoded using the Polar code decoder. When decoding those sub-channels {89, 141, 31, 147, 72, 162, 46, 101, 52, 149, 47, 76, 105, 163} copied from the new transmission, data on those sub-channels are replaced or combined based on data on the above-mentioned decoded P=14 sub-channels {112, 189, 160, 120, 176, 124, 184, 126, 188, 127, 190, 191, 128, 192}. The decoder then decodes the other subsequent sub-channels.

Figure 6:
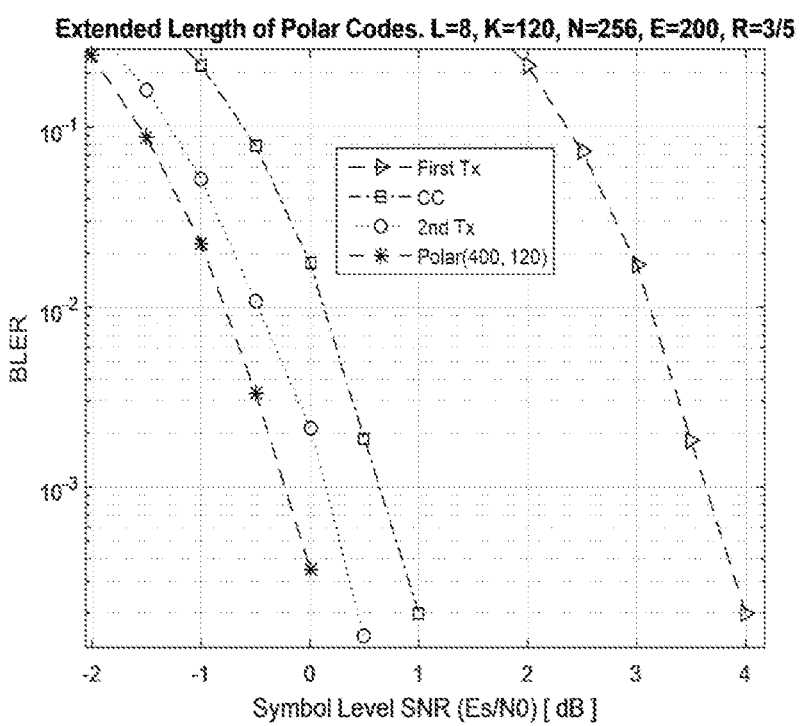
FIG. 6 illustrates a comparison of exemplary block error rate (BLER) performances of various encoding methods, in accordance with some embodiments of the present disclosure.

FIG. 6 illustrates a comparison of exemplary block error rate (BLER) performances of various encoding methods, in accordance with the first embodiment. As shown in FIG. 6, after using the above method in the first embodiment (the line marked with "○" and labeled as "2nd Tx" in FIG. 6) (List size used for decoding is 8, L=8), it can achieve a gain of 0.61 dB (read at BLER=1%, using an AWGN channel model) compared to Chase Combination (CC; the line marked with "□" and labeled as "CC" in FIG. 6). At the same time, it can be seen that the performance of the above method in the first embodiment is close to the ideal target performance (a simulation result of half code rate; the line marked with "*" and labeled as "Polar (400, 120)" in FIG. 6).

Figure 7:
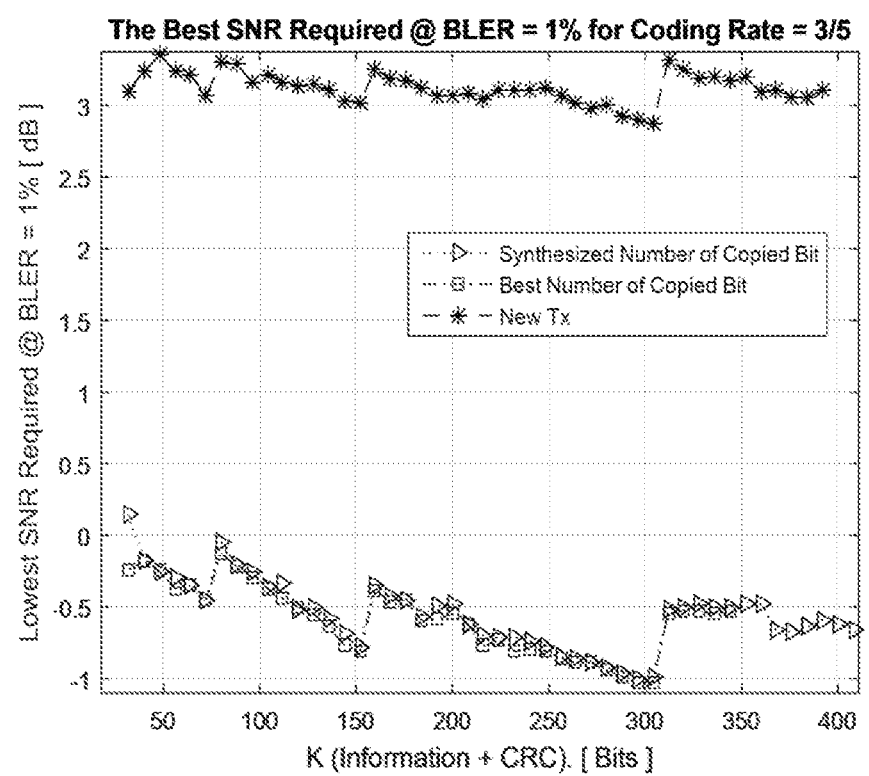
FIG. 7 illustrates a comparison of exemplary signal-to-noise ratio (SNR) performances of various encoding methods, in accordance with some embodiments of the present disclosure.

FIG. 7 illustrates a comparison of exemplary signal-to-noise ratio (SNR) performances of various encoding methods, in accordance with the first embodiment. As shown in FIG. 7, after using the above method in the first embodiment, the retransmission performance (the line marked with triangle and labeled as "Synthesized Number of Copied Bit") is made very close to the best possible performance (the line marked with squares and labeled as "Best Number of Copied Bit"). Although the above method in the first embodiment describes encoding of the retransmission and encoding of the new transmission separately, the encoding of the new transmission and the retransmission can also be done at one time. That is, it is possible to encode a codeword of 2N=512 bits long at one time.

A second embodiment is disclosed based on the following exemplary parameters: the information length K=100 bits, the length of the Polar code mother code N=512, the number of bits after rate matching (i.e., the number of bits that the resource can carry) E=500 bits, using two times of transmission (i.e., retransmission one time), each transmission uses the same E resource bits, P=floor(1+(((R)/A)*E/B)^2+ (((R)/A)^2*E/C))=2 bits are copied during the retransmission, where R=K/E=100/500=1/5, A=563/1024=0.55, B=320, C=47, floor( ) is the floor function that takes as input a real number x and gives as output the greatest integer less than or equal to x, and ( )^2 is the square operation.

Since the code rate R<7/16, the first transmission (new transmission) will be encoded using puncturing scheme (i.e., the last E codeword bits after sub-block interleaving will be transmitted, and the first N−E codeword bits will not be transmitted).

The encoding in the new transmission is performed in accordance with a conventional Polar code 510 as shown in the lower half of FIG. 5. After the encoding is completed (including sub-block interleaving), N codeword bits are written into the first N bits 531 of a circular buffer with length 2N. In one example, according to the Polar code sequence, for the new transmission, numbers of the sub-channels carrying the K information bits are {247, 351, 461, 250, 412, 366, 441, 375, 424, 467, 251, 372, 482, 414, 367, 469, 430, 253, 374, 483, 428, 415, 224, 473, 456, 378, 436, 320, 485, 431, 489, 240, 379, 460, 438, 381, 462, 497, 352, 468, 439, 252, 463, 443, 442, 470, 248, 368, 254, 376, 445, 471, 484, 416, 486, 474, 475, 255, 380, 432, 490, 487, 477, 440, 491, 464, 382, 498, 493, 444, 383, 499, 446, 472, 501, 447, 476, 488, 505, 256, 478, 492, 479, 384, 494, 500, 503, 495, 502, 448, 506, 507, 480, 509, 496, 504, 508, 510, 511, 512}. The above sub-channels are arranged according to their reliabilities, from worst reliability to best reliability. Other sub-channels are set to frozen bit "0". The transmitting end transmits the E=500 codeword bits in the first half of the circular buffer after the sub-block is interleaved.

For retransmission, P=2 bits from sub-channels with the worst sub-channel reliability are copied from the newly transmitted K information bits, and put into the retransmission data to transmit through the Polar code 520, as shown in the upper part of FIG. 5. In one example, the P worst reliability sub-channels have numbers of {247, 351}, arranged according to their reliabilities, from worst reliability to best reliability The retransmission may use the same encoding scheme as the new transmission. Here, the retransmission also uses the puncturing scheme. That is, the new transmission and the retransmission use the same sequence, the same sub-block interleaving, and the same puncturing pattern. Then, during retransmission, numbers of the sub-channels carrying P information bits are {511, 512} arranged according to their reliabilities, from worst reliability to best reliability. Other sub-channels are set to frozen bits "0".

After the encoding for retransmission is completed (including sub-block interleaving), a XOR operation (or modulo 2 addition) may be performed on the encoded data with respect to the newly transmitted N codeword bits to obtain N codeword bits after the exclusive OR operation. Then, the N codeword bits are written into the second N bits 532 of the circular buffer with length 2N, as shown in FIG. 5.

The transmitting end transmits E=500 codeword bits stored in the latter half of the circular buffer after XOR. The receiving end decodes the new transmission. If the decoding is unsuccessful, the receiving end waits for the transmitter to retransmit data. The receiving end concatenates the retransmitted data with the newly transmitted data for decoding. After receiving the E=500 data, the receiving end will initialize the N−E=512−500=12 data that has not been transmitted into 0 to obtain N=512 data. Then the retransmitted data and the newly transmitted data are concatenated to become 2N=2*512=1024 data to be decoded, wherein the first half N data are retransmitted data and the second half N data are newly transmitted data. During the decoding of the 2N data, the bits decoded from the first half N data are used to replace (or combine) the bits copied from the new transmission. In one embodiment, a box-plus may be performed on the received retransmitted data and the received newly transmitted data without a concatenation of the two data, to obtain a first half data corresponding to the retransmission and a second half data corresponding to the new transmission. The bits copied from the new transmission are then replaced (or combined) with the bits decoded from the first half data.

Figure 8:
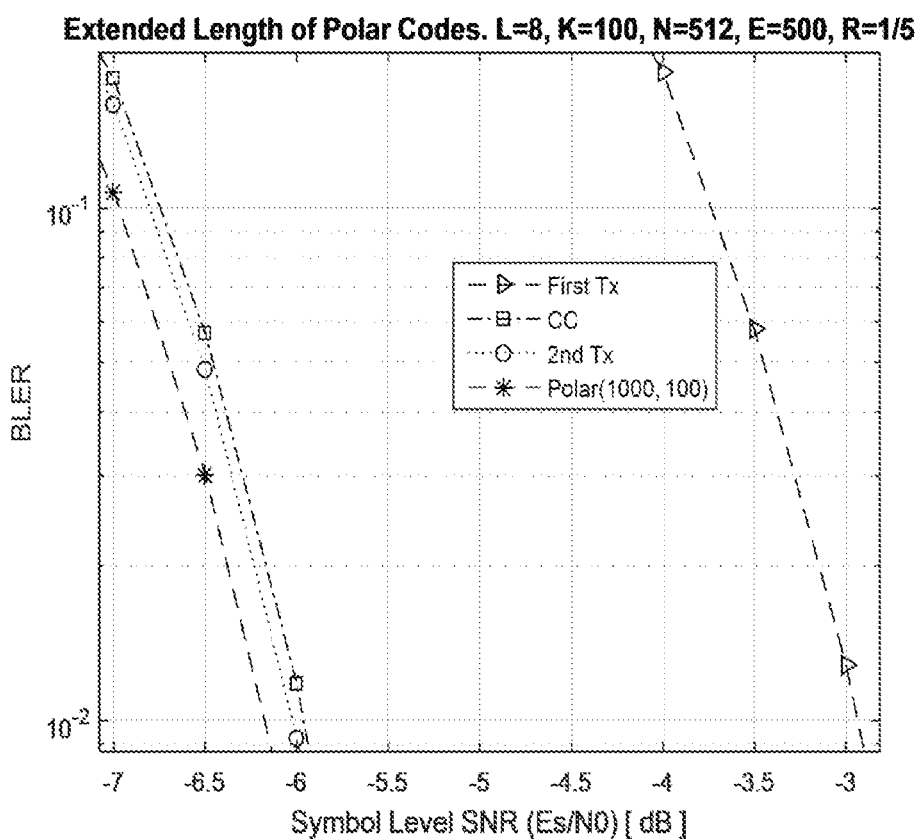
FIG. 8 illustrates another comparison of exemplary BLER performances of various encoding methods, in accordance with some embodiments of the present disclosure.

FIG. 8 illustrates another comparison of exemplary BLER performances of various encoding methods, in accordance with the second embodiment. As shown in FIG. 8, after using the above method in the second embodiment (the line marked with "o" and labeled as "2nd Tx" in FIG. 8), it can achieve a gain of 0.06 dB (read at BLER=1%) compared to Chase Combination (CC; the line marked with "□" and labeled as "CC" in FIG. 8). At the same time, it can be seen that the performance of the above method in the second embodiment is close to the ideal target performance (a simulation result of half code rate; the line marked with "*" and labeled as "Polar (1000, 100)" in FIG. 8).

Figure 9:
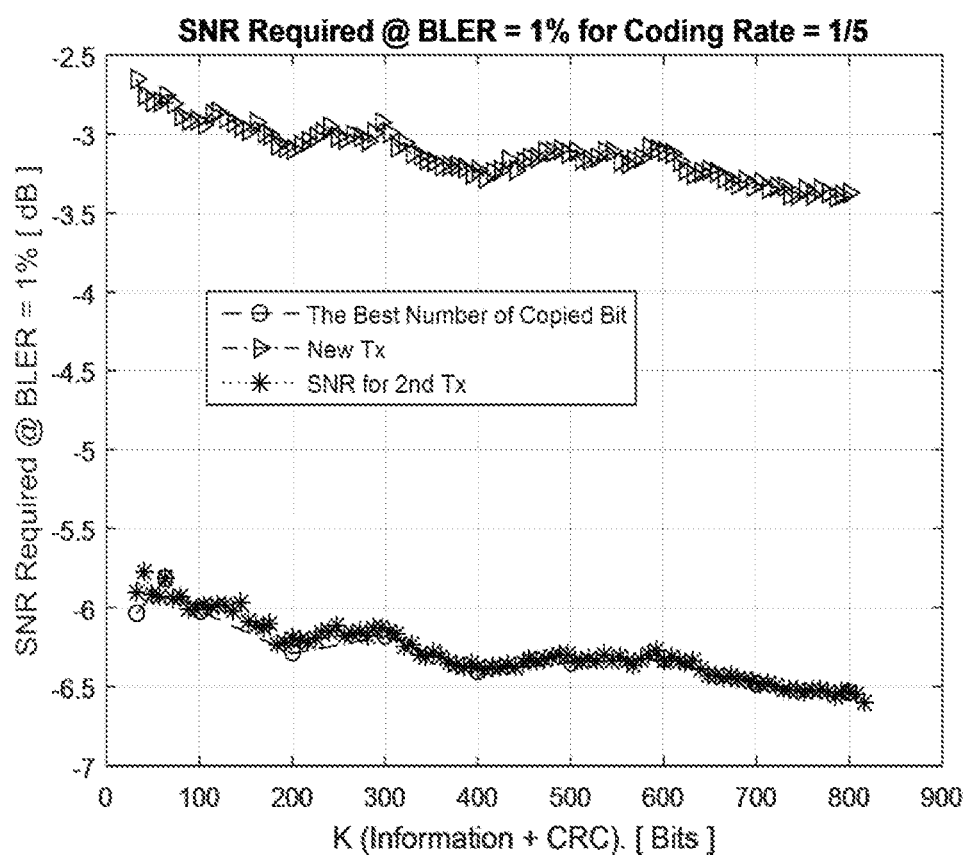
FIG. 9 illustrates another comparison of exemplary SNR performances of various encoding methods, in accordance with some embodiments of the present disclosure.

FIG. 9 illustrates another comparison of exemplary SNR performances of various encoding methods, in accordance with the second embodiment. As shown in FIG. 9, after using the above method in the second embodiment, the performance of retransmission (the line marked with "*" and labeled as "SNR for 2nd Tx" in FIG. 9) is made very close to the best possible performance (the line marked with "○" and labeled as "The Best Number of Copied Bit").

Further, when the code rate R≥1/3, the number of copied bits P can also use the formula of the high code rate (in the first embodiment). That is, P=floor((((R)/A)*E/B)^2+(((R)/A)^2*E/C)), where R=K/E is the code rate, A=563/1024=0.55, B=280, C=17, floor( ) is the floor function that takes as input a real number x and gives as output the greatest integer less than or equal to x, and ( )^2 is the square operation.

In addition, the above lower rounding operation floor( ) can also be replaced with the upper rounding operation ceil( ) For example, P=ceil((((R)/A)*E/B)^2+(((R)/A)^2*E/C)). In addition, the number of copied bits P can also be calculated using the following formula: P=floor(1+2*N*A*(R^D)), where N is the length of the Polar code mother code of the new transmission (first transmission), A=139/1024, R is the code rate, D=1.8.

In addition, different copy bit number formulas can be used at different code rates. For example, the formula listed in the first embodiment may be used when the code rate R is within a certain range, e.g. preferably R≥1/3, optionally R≥1/5. In another example, the formula listed in the second embodiment may be used when the code rate R is within a certain range, e.g. preferably R<1/3, optionally R≤1/5. In addition, the number of copied bits P may also be obtained by looking up a corresponding table below.

| K | 32 | 64 | 100 | 200 | 300 | 400 | 480 |
|---|---|---|---|---|---|---|---|
| E | 273 | 546 | 853 | 1706 | 2560 | 3413 | 4096 |
| Number of copied bits (P) when R = 120/1024 | 2 | 2 | 2 | 2 | 6 | 8 | 8 |

| K | 32 | 64 | 100 | 200 | 300 | 400 | 500 | 600 | 700 | 800 |
|---|---|---|---|---|---|---|---|---|---|---|
| E | 160 | 320 | 500 | 1000 | 1500 | 2000 | 2500 | 3000 | 3500 | 4000 |
| Number of copied bits (P) when R = 1/5 | 2 | 2 | 2 | 6 | 9 | 12 | 18 | 20 | 24 | 27 |

| K | 32 | 64 | 100 | 200 | 300 | 400 | 500 | 600 | 700 | 800 | 900 | 1024 |
|---|---|---|---|---|---|---|---|---|---|---|---|---|
| E | 96 | 192 | 300 | 600 | 900 | 1200 | 1500 | 1800 | 2100 | 2400 | 2700 | 3072 |
| Number of copied bits (P) when R = 1/3 | 2 | 4 | 6 | 15 | 20 | 34 | 48 | 64 | 72 | 81 | 88 | 98 |

| K | 32 | 64 | 100 | 200 | 300 | 400 | 500 | 600 | 700 | 800 | 900 | 1024 |
|---|---|---|---|---|---|---|---|---|---|---|---|---|
| E | 80 | 160 | 250 | 500 | 750 | 1000 | 1250 | 1500 | 1750 | 2000 | 2250 | 2560 |
| Number of copied bits (P) when R = 2/5 | 2 | 4 | 7 | 18 | 27 | 37 | 52 | 64 | 73 | 81 | 90 | 105 |

| K | 32 | 100 | 200 | 300 | 400 | 500 | 600 | 700 | 800 | 900 | 1024 |
|---|---|---|---|---|---|---|---|---|---|---|---|
| E | 64 | 200 | 400 | 600 | 800 | 1000 | 1200 | 1400 | 1600 | 1800 | 2048 |
| Number of copied bits (P) when R = 1/2 | 2 | 7 | 23 | 30 | 46 | 63 | 74 | 84 | 100 | 96 | 132 |

| K | 32 | 100 | 200 | 300 | 400 | 500 | 600 | 700 | 800 | 900 | 1024 |
|---|---|---|---|---|---|---|---|---|---|---|---|
| E | 53 | 166 | 333 | 500 | 666 | 833 | 1000 | 1166 | 1333 | 1500 | 1706 |
| Number of copied bits (P) when R = 3/5 | 2 | 10 | 24 | 46 | 56 | 68 | 87 | 95 | 109 | 128 | 136 |

| K | 32 | 90 | 180 | 300 | 420 | 510 | 600 | 720 | 810 | 900 | 1024 |
|---|---|---|---|---|---|---|---|---|---|---|---|
| E | 42 | 120 | 240 | 400 | 560 | 680 | 800 | 960 | 1080 | 1200 | 1365 |
| Number of copied bits (P) when R = 3/4 | 4 | 15 | 30 | 51 | 74 | 89 | 112 | 134 | 138 | 151 | 184 |

| K | 32 | 65 | 91 | 221 | 351 | 481 | 611 | 741 | 871 | 910 | 1024 |
|---|---|---|---|---|---|---|---|---|---|---|---|
| E | 34 | 70 | 98 | 238 | 378 | 518 | 658 | 798 | 938 | 980 | 1102 |
| Number of copied bits (P) when R = 13/14 | 4 | 12 | 17 | 48 | 82 | 104 | 139 | 163 | 205 | 217 | 220 |

A third embodiment is disclosed based on the following exemplary parameters: the information length K=180 bits (K also included CRC if there is a CRC), the length of the Polar code mother code N=256, the number of bits after rate matching (i.e., the number of bits that the resource can carry) E=240 bits, using two times of transmission (i.e., retransmission one time), each transmission uses the same E resource bits, P=floor((((R)/A))*E/B)^2+(((R)/A)^2* E/C))=37 bits are copied during the retransmission, where R=K/E=180/240=3/4, A=563/1024=0.55, B=105, C=16, floor( ) is the floor function that takes as input a real number x and gives as output the greatest integer less than or equal to x, and ( )^2 is the square operation.

Since the code rate R>7/16, the third embodiment uses the shortening scheme to encode during the first transmission (i.e. the new transmission). That is, the last N−E codeword bits after sub-block interleaving will be known "0" so that these codeword bits with known values are not transmitted.

The encoding in the new transmission is performed in accordance with a conventional Polar code 510 as shown in the lower half of FIG. 5. After the encoding is completed (including sub-block interleaving), N codeword bits are written into the first N bits 531 of a circular buffer with length 2N. In one example, according to the Polar code sequence, for the new transmission, numbers of the sub-channels carrying the K information bits are {51, 74, 16, 134, 53, 24, 135, 77, 138, 83, 57, 28, 98, 40, 85, 139, 146, 30, 44, 99, 89, 141, 31, 147, 72, 162, 46, 101, 52, 149, 47, 76, 105, 163, 54, 194, 153, 78, 165, 55, 84, 58, 113, 136, 79, 195, 86, 59, 169, 140, 100, 87, 61, 90, 197, 142, 102, 148, 177, 143, 32, 201, 91, 150, 103, 106, 164, 93, 48, 209, 151, 154, 166, 107, 56, 114, 155, 80, 109, 225, 167, 196, 60, 170, 115, 157, 88, 198, 117, 171, 62, 178, 92, 199, 173, 121, 202, 63, 144, 104, 179, 94, 203, 108, 181, 152, 210, 95, 205, 156, 211, 110, 185, 116, 168, 226, 158, 111, 118, 213, 172, 227, 217, 159, 119, 174, 122, 200, 180, 229, 175, 123, 204, 64, 182, 233, 125, 206, 183, 212, 186, 207, 96, 214, 187, 228, 112, 215, 189, 218, 230, 160, 120, 219, 231, 234, 176, 124, 221, 184, 235, 126, 208, 188, 237, 127, 190, 216, 220, 232, 191, 222, 236, 223, 238, 239, 128, 192, 224, 2401. The above sub-channels are arranged according to their reliabilities, from worst reliability to best reliability. Other sub-channels are set to frozen bit "0". The transmitting end transmits the E=240 codeword bits in the first half of the circular buffer after the sub-block is interleaved.

For retransmission, first, P=37 bits from sub-channels with the worst sub-channel reliability are copied from the newly transmitted K information bits, and put into the retransmission data to transmit through the Polar code 520, as shown in the upper part of FIG. 5. In one example, the P worst reliability sub-channels have numbers of {51, 74, 16, 134, 53, 24, 135, 77, 138, 83, 57, 28, 98, 40, 85, 139, 146, 30, 44, 99, 89, 141, 31, 147, 72, 162, 46, 101, 52, 149, 47, 76, 105, 163, 54, 194, 153} arranged according to their reliabilities, from worst reliability to best reliability.

The retransmission may use a different encoding method from that of the new transmission. Here, the retransmission uses a Puncturing method. That is, the new transmission and the retransmission use the same sequence, the same sub-block interleaving, but different puncturing patterns. Then, during retransmission, numbers of the sub-channels carrying P information bits are {221, 184, 235, 126, 242, 208, 188, 237, 127, 243, 245, 190, 216, 220, 232, 249, 191, 222, 236, 223, 238, 244, 239, 246, 128, 192, 247, 250, 251, 253, 224, 240, 252, 248, 254, 255, 256} arranged according to their reliabilities, from worst reliability to best reliability. Other sub-channels are set to frozen bits "0".

After the encoding for retransmission is completed (including sub-block interleaving), a XOR operation (or modulo 2 addition) may be performed on the encoded data with respect to the newly transmitted N codeword bits to obtain N codeword bits after the exclusive OR operation. Here, the XOR operation (modulo 2 addition) is performed on the last E=240 codeword bits in the retransmission after the encoding (including the sub-block interleaving) and the first E=240 codeword bits in the new transmission after the encoding (including the sub-block interleaving), while the other codeword bits are unchanged without any operation (or, the other codeword bits may be XORed with the last N−E codeword bits after the sub-block interleaving in the new transmission). Thereafter, the N codeword bits are written into the second N bits 532 of the circular buffer with length 2N, as shown in FIG. 5.

The transmitting end transmits E=240 codeword bits stored in the latter half of the circular buffer after XOR. The receiving end decodes the new transmission. If the decoding is unsuccessful, the receiving end waits for the transmitter to retransmit data. The receiving end concatenates the retransmitted data with the newly transmitted data to obtain 2N=2*256=512 soft bits, based on a method similar to that in the second embodiment, and replaces (or combines) the bits copied from the new transmission with the bits decoded from the first half data (i.e., retransmitted data).

Figure 10:
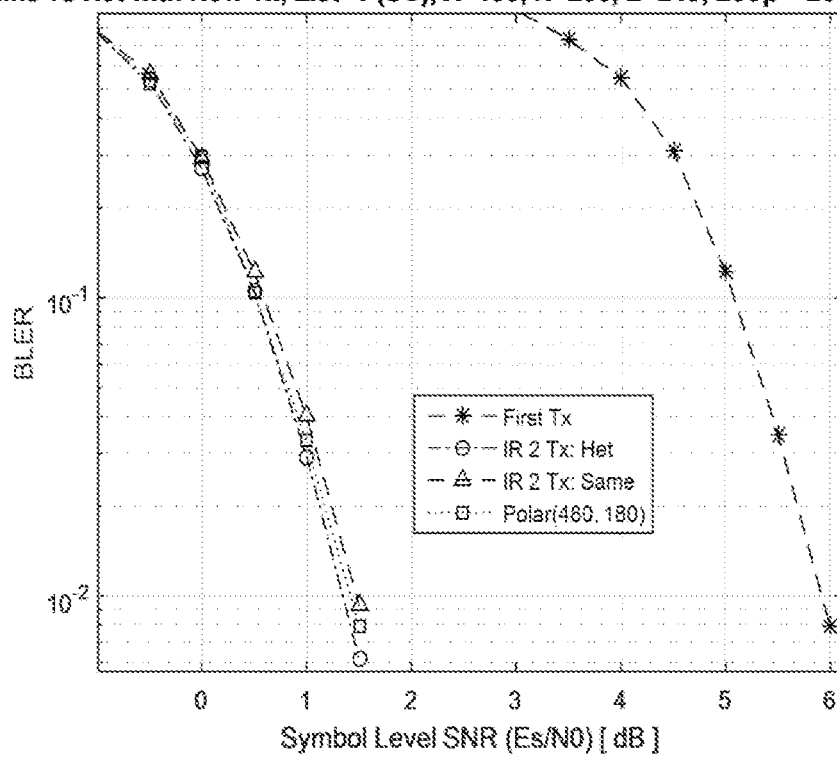
FIG. 10 illustrates yet another comparison of exemplary BLER performances of various encoding methods, in accordance with some embodiments of the present disclosure.

FIG. 10 illustrates yet another comparison of exemplary BLER performances of various encoding methods, in accordance with the third embodiment. As shown in FIG. 10, after using the above method in the third embodiment (the line marked with "○" and labeled as "IR 2 Tx: Het" in FIG. 10; List size used for decoding is 1, i.e., SC decoding, BLER=1%, using the AWGN channel model), it can achieve a gain of 0.12 dB compared to a conventional method (the line marked with "Δ" and labeled as "IR 2 Tx: Same" in FIG. 10).

A fourth embodiment is disclosed based on the following exemplary parameters: the information length K=200 bits (K also included CRC if there is a CRC), the length of the Polar code mother code N=256, the number of bits after rate matching (i.e., the number of bits that the resource can carry) E=250 bits, using two times of transmission (i.e., retransmission one time), each transmission uses the same E resource bits, P=floor ((((R)/a retransmission)*E/B) 2+ (((R)/A) 2*E/C))=32 bits are copied during the retransmission, and a one-time encoded codeword having a length of 2N=512 bits, where R=K/E=200/250=4/5, A=563/1024=0.55, B=280, C=17, floor( ) is the floor function that takes as input a real number x and gives as output the greatest integer less than or equal to x, and ( ) 2 is the square operation.

In one example, a Polar code sequence of length N=256 is Seq_256={1, 2, 3, 5, 9, 17, 33, 4, 6, 65, 10, 7, 18, 11, 19, 129, 13, 34, 66, 21, 35, 25, 37, 8, 130, 67, 12, 41, 69, 131, 20, 14, 49, 15, 73, 22, 133, 36, 27, 81, 38, 26, 23, 137, 39, 97, 68, 42, 145, 29, 70, 43, 50, 75, 161, 193, 71, 45, 132, 82, 51, 74, 16, 134, 53, 24, 135, 77, 138, 83, 57, 28, 98, 40, 85, 139, 146, 30, 44, 99, 89, 141, 31, 147, 72, 162, 46, 101, 52, 149, 47, 76, 105, 163, 54, 194, 153, 78, 165, 55, 84, 58, 113, 136, 79, 195, 86, 59, 169, 140, 100, 87, 61, 90, 197, 142, 102, 148, 177, 143, 32, 201, 91, 150, 103, 106, 164, 93, 48, 209, 151, 154, 166, 107, 56, 114, 155, 80, 109, 225, 167, 196, 60, 170, 115, 157, 88, 198, 117, 171, 62, 178, 92, 199, 173, 121, 202, 63, 144, 104, 179, 94, 203, 108, 181, 152, 210, 95, 205, 156, 211, 110, 185, 116, 168, 226, 158, 111, 118, 213, 172, 227, 217, 159, 119, 174, 122, 200, 180, 229, 175, 123, 204, 64, 182, 233, 125, 206, 183, 212, 186, 241, 207, 96, 214, 187, 228, 112, 215, 189, 218, 230, 160, 120, 219, 231, 234, 176, 124, 221, 184, 235, 126, 242, 208, 188, 237, 127, 243, 245, 190, 216, 220, 232, 249, 191, 222, 236, 223, 238, 244, 239, 246, 128, 192, 247, 250, 251, 253, 224, 240, 252, 248, 254, 255, 256}, and the sub-block interleaving pattern of length N is Sub_Block_Interleaver_256={1, 2, 3, 4, 5, 6, 7, 8, 9, 10, 11, 12, 13, 14, 15, 16, 17, 18, 19, 20, 21, 22, 23, 24, 33, 34, 35, 36, 37, 38, 39, 40, 25, 26, 27, 28, 29, 30, 31, 32, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 129, 130, 131, 132, 133, 134, 135, 136, 73, 74, 75, 76, 77, 78, 79, 80, 137, 138, 139, 140, 141, 142, 143, 144, 81, 82, 83, 84, 85, 86, 87, 88, 145, 146, 147, 148, 149, 150, 151, 152, 89, 90, 91, 92, 93, 94, 95, 96, 153, 154, 155, 156, 157, 158, 159, 160, 97, 98, 99, 100, 101, 102, 103, 104, 161, 162, 163, 164, 165, 166, 167, 168, 105, 106, 107, 108, 109, 110, 111, 112, 169, 170, 171, 172, 173, 174, 175, 176, 113, 114, 115, 116, 117, 118, 119, 120, 177, 178, 179, 180, 181, 182, 183, 184, 121, 122, 123, 124, 125, 126, 127, 128, 185, 186, 187, 188, 189, 190, 191, 192, 193, 194, 195, 196, 197, 198, 199, 200, 201, 202, 203, 204, 205, 206, 207, 208, 209, 210, 211, 212, 213, 214, 215, 216, 225, 226, 227, 228, 229, 230, 231, 232, 217, 218, 219, 220, 221, 222, 223, 224, 233, 234, 235, 236, 237, 238, 239, 240, 241, 242, 243, 244, 245, 246, 247, 248, 249, 250, 251, 252, 253, 254, 255, 256}.

First, the sequence Seq_256 of length N is offset by N to obtain the sequence Seq_256_Shift=Seq_256+N. That is, Seq_256_Shift={257, 258, 259, 261, 265, 273, 289, 260, 262, 321, 266, 263, 274, 267, 275, 385, 269, 290, 322, 277, 291, 281, 293, 264, 386, 323, 268, 297, 325, 387, 276, 270, 305, 271, 329, 278, 389, 292, 283, 337, 294, 282, 279, 393, 295, 353, 324, 298, 401, 285, 326, 299, 306, 331, 417, 449, 327, 301, 388, 338, 307, 330, 272, 390, 309, 280, 391, 333, 394, 339, 313, 284, 354, 296, 341, 395, 402, 286, 300, 355, 345, 397, 287, 403, 328, 418, 302, 357, 308, 405, 303, 332, 361, 419, 310, 450, 409, 334, 421, 311, 340, 314, 369, 392, 335, 451, 342, 315, 425, 396, 356, 343, 317, 346, 453, 398, 358, 404, 433, 399, 288, 457, 347, 406, 359, 362, 420, 349, 304, 465, 407, 410, 422, 363, 312, 370, 411, 336, 365, 481, 423, 452, 316, 426, 371, 413, 344, 454, 373, 427, 318, 434, 348, 455, 429, 377, 458, 319, 400, 360, 435, 350, 459, 364, 437, 408, 466, 351, 461, 412, 467, 366, 441, 372, 424, 482, 414, 367, 374, 469, 428, 483, 473, 415, 375, 430, 378, 456, 436, 485, 431, 379, 460, 320, 438, 489, 381, 462, 439, 468, 442, 497, 463, 352, 470, 443, 484, 368, 471, 445, 474, 486, 416, 376, 475, 487, 490, 432, 380, 477, 440, 491, 382, 498, 464, 444, 493, 383, 499, 501, 446, 472, 476, 488, 505, 447, 478, 492, 479, 494, 500, 495, 502, 384, 448, 503, 506, 507, 509, 480, 496, 508, 504, 510, 511, 512}.

Second, the sequence Seq_256 of length N and the sequence Seq_256_Shift of length N are combined to obtain a sequence of length 2N=512. The obtained sequence may be Seq_512={Seq_256, Seq_256_Shift}={1, 2, 3, 5, 9, 17, 33, 4, 6, 65, 10, 7, 18, 11, 19, 129, 13, 34, 66, 21, 35, 25, 37, 8, 130, 67, 12, 41, 69, 131, 20, 14, 49, 15, 73, 22, 133, 36, 27, 81, 38, 26, 23, 137, 39, 97, 68, 42, 145, 29, 70, 43, 50, 75, 161, 193, 71, 45, 132, 82, 51, 74, 16, 134, 53, 24, 135, 77, 138, 83, 57, 28, 98, 40, 85, 139, 146, 30, 44, 99, 89, 141, 31, 147, 72, 162, 46, 101, 52, 149, 47, 76, 105, 163, 54, 194, 153, 78, 165, 55, 84, 58, 113, 136, 79, 195, 86, 59, 169, 140, 100, 87, 61, 90, 197, 142, 102, 148, 177, 143, 32, 201, 91, 150, 103, 106, 164, 93, 48, 209, 151, 154, 166, 107, 56, 114, 155, 80, 109, 225, 167, 196, 60, 170, 115, 157, 88, 198, 117, 171, 62, 178, 92, 199, 173, 121, 202, 63, 144, 104, 179, 94, 203, 108, 181, 152, 210, 95, 205, 156, 211, 110, 185, 116, 168, 226, 158, 111, 118, 213, 172, 227, 217, 159, 119, 174, 122, 200, 180, 229, 175, 123, 204, 64, 182, 233, 125, 206, 183, 212, 186, 241, 207, 96, 214, 187, 228, 112, 215, 189, 218, 230, 160, 120, 219, 231, 234, 176, 124, 221, 184, 235, 126, 242, 208, 188, 237, 127, 243, 245, 190, 216, 220, 232, 249, 191, 222, 236, 223, 238, 244, 239, 246, 128, 192, 247, 250, 251, 253, 224, 240, 252, 248, 254, 255, 256, 257, 258, 259, 261, 265, 273, 289, 260, 262, 321, 266, 263, 274, 267, 275, 385, 269, 290, 322, 277, 291, 281, 293, 264, 386, 323, 268, 297, 325, 387, 276, 270, 305, 271, 329, 278, 389, 292, 283, 337, 294, 282, 279, 393, 295, 353, 324, 298, 401, 285, 326, 299, 306, 331, 417, 449, 327, 301, 388, 338, 307, 330, 272, 390, 309, 280, 391, 333, 394, 339, 313, 284, 354, 296, 341, 395, 402, 286, 300, 355, 345, 397, 287, 403, 328, 418, 302, 357, 308, 405, 303, 332, 361, 419, 310, 450, 409, 334, 421, 311, 340, 314, 369, 392, 335, 451, 342, 315, 425, 396, 356, 343, 317, 346, 453, 398, 358, 404, 433, 399, 288, 457, 347, 406, 359, 362, 420, 349, 304, 465, 407, 410, 422, 363, 312, 370, 411, 336, 365, 481, 423, 452, 316, 426, 371, 413, 344, 454, 373, 427, 318, 434, 348, 455, 429, 377, 458, 319, 400, 360, 435, 350, 459, 364, 437, 408, 466, 351, 461, 412, 467, 366, 441, 372, 424, 482, 414, 367, 374, 469, 428, 483, 473, 415, 375, 430, 378, 456, 436, 485, 431, 379, 460, 320, 438, 489, 381, 462, 439, 468, 442, 497, 463, 352, 470, 443, 484, 368, 471, 445, 474, 486, 416, 376, 475, 487, 490, 432, 380, 477, 440, 491, 382, 498, 464, 444, 493, 383, 499, 501, 446, 472, 476, 488, 505, 447, 478, 492, 479, 494, 500, 495, 502, 384, 448, 503, 506, 507, 509, 480, 496, 508, 504, 510, 511, 512}351, 461, 412, 467, 366, 441, 372, 424, 482, 414, 367, 374, 469, 428, 483, 473, 415, 375, 430, 378, 456, 436, 485, 431, 379, 460, 320, 438, 489, 381, 462, 439, 468, 442, 497, 463, 352, 470, 443, 484, 368, 471, 445, 474, 486, 416, 376, 475, 487, 490, 432, 380, 477, 440, 491, 382, 498, 464, 444, 493, 383, 499, 501, 446, 472, 476, 488, 505, 447, 478, 492, 479, 494, 500, 495, 502, 384, 448, 503, 506, 507, 509, 480, 496, 508, 504, 510, 511, 512}351, 461, 412, 467, 366, 441, 372, 424, 482, 414, 367, 374, 469, 428, 483, 473, 415, 375, 430, 378, 456, 436, 485, 431, 379, 460, 320, 438, 489, 381, 462, 439, 468, 442, 497, 463, 352, 470, 443, 484, 368, 471, 445, 474, 486, 416, 376, 475, 487, 490, 432, 380, 477, 440, 491, 382, 498, 464, 444, 493, 383, 499, 501, 446, 472, 476, 488, 505, 447, 478, 492, 479, 494, 500, 495, 502, 384, 448, 503, 506, 507, 509, 480, 496, 508, 504, 510, 511, 512}.

Similarly, after being offset by N and a combination, a sub-block interleaving pattern with a length of 2N=512 can be obtained. The obtained sub-block interleaving pattern may be Sub_Block_Interleaver_512={1, 2, 3, 4, 5, 6, 7, 8, 9, 10, 11, 12, 13, 14, 15, 16, 17, 18, 19, 20, 21, 22, 23, 24, 33, 34, 35, 36, 37, 38, 39, 40, 25, 26, 27, 28, 29, 30, 31, 32, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 129, 130, 131, 132, 133, 134, 135, 136, 73, 74, 75, 76, 77, 78, 79, 80, 137, 138, 139, 140, 141, 142, 143, 144, 81, 82, 83, 84, 85, 86, 87, 88, 145, 146, 147, 148, 149, 150, 151, 152, 89, 90, 91, 92, 93, 94, 95, 96, 153, 154, 155, 156, 157, 158, 159, 160, 97, 98, 99, 100, 101, 102, 103, 104, 161, 162, 163, 164, 165, 166, 167, 168, 105, 106, 107, 108, 109, 110, 111, 112, 169, 170, 171, 172, 173, 174, 175, 176, 113, 114, 115, 116, 117, 118, 119, 120, 177, 178, 179, 180, 181, 182, 183, 184, 121, 122, 123, 124, 125, 126, 127, 128, 185, 186, 187, 188, 189, 190, 191, 192, 193, 194, 195, 196, 197, 198, 199, 200, 201, 202, 203, 204, 205, 206, 207, 208, 209, 210, 211, 212, 213, 214, 215, 216, 225, 226, 227, 228, 229, 230, 231, 232, 217, 218, 219, 220, 221, 222, 223, 224, 233, 234, 235, 236, 237, 238, 239, 240, 241, 242, 243, 244, 245, 246, 247, 248, 249, 250, 251, 252, 253, 254, 255, 256, 257, 258, 259, 260, 261, 262, 263, 264, 265, 266, 267, 268, 269, 270, 271, 272, 273, 274, 275, 276, 277, 278, 279, 280, 289, 290, 291, 292, 293, 294, 295, 296, 281, 282, 283, 284, 285, 286, 287, 288, 297, 298, 299, 300, 301, 302, 303, 304, 305, 306, 307, 308, 309, 310, 311, 312, 313, 314, 315, 316, 317, 318, 319, 320, 321, 322, 323, 324, 325, 326, 327, 328, 385, 386, 387, 388, 389, 390, 391, 392, 329, 330, 331, 332, 333, 334, 335, 336, 393, 394, 395, 396, 397, 398, 399, 400, 337, 338, 339, 340, 341, 342, 343, 344, 401, 402, 403, 404, 405, 406, 407, 408, 345, 346, 347, 348, 349, 350, 351, 352, 409, 410, 411, 412, 413, 414, 415, 416, 353, 354, 355, 356, 357, 358, 359, 360, 417, 418, 419, 420, 421, 422, 423, 424, 361, 362, 363, 364, 365, 366, 367, 368, 425, 426, 427, 428, 429, 430, 431, 432, 369, 370, 371, 372, 373, 374, 375, 376, 433, 434, 435, 436, 437, 438, 439, 440, 377, 378, 379, 380, 381, 382, 383, 384, 441, 442, 443, 444, 445, 446, 447, 448, 449, 450, 451, 452, 453, 454, 455, 456, 457, 458, 459, 460, 461, 462, 463, 464, 465, 466, 467, 468, 469, 470, 471, 472, 481, 482, 483, 484, 485, 486, 487, 488, 473, 474, 475, 476, 477, 478, 479, 480, 489, 490, 491, 492, 493, 494, 495, 496, 497, 498, 499, 500, 501, 502, 503, 504, 505, 506, 507, 508, 509, 510, 511, 512}.

Since the code rate R=K/E=200/250=4/5 exceeds 7/16, the last N−E=256−250=6 sub-channels in the sub-block interleaving pattern Sub_Block_Interleaver_512 need to be set to frozen bit "0" and cannot be used to carry information. That is, the sub-channels Frozen_10={507, 508, 509, 510, 511, 512} need to be frozen into bits "0". Accordingly, Frozen_10_Shift=Frozen_10−N=Frozen_10−256={251, 252, 253, 254, 255, 256} also need to be set to frozen bit "0" and cannot be used to carry information.

Then, the data of K=200 bits to be encoded are placed on the most reliable sub-channels of the above 2N sequences except for the above-mentioned frozen sub-channels, e.g. on sub-channels Info_200={326, 299, 306, 331, 417, 449, 327, 301, 388, 338, 307, 330, 272, 390, 309, 280, 391, 333, 394, 339, 313, 284, 354, 296, 341, 395, 402, 286, 300, 355, 345, 397, 287, 403, 328, 418, 302, 357, 308, 405, 303, 332, 361, 419, 310, 450, 409, 334, 421, 311, 340, 314, 369, 392, 335, 451, 342, 315, 425, 396, 356, 343, 317, 346, 453, 398, 358, 404, 433, 399, 288, 457, 347, 406, 359, 362, 420, 349, 304, 465, 407, 410, 422, 363, 312, 370, 411, 336, 365, 481, 423, 452, 316, 426, 371, 413, 344, 454, 373, 427, 318, 434, 348, 455, 429, 377, 458, 319, 400, 360, 435, 350, 459, 364, 437, 408, 466, 351, 461, 412, 467, 366, 441, 372, 424, 482, 414, 367, 374, 469, 428, 483, 473, 415, 375, 430, 378, 456, 436, 485, 431, 379, 460, 320, 438, 489, 381, 462, 439, 468, 442, 497, 463, 352, 470, 443, 484, 368, 471, 445, 474, 486, 416, 376, 475, 487, 490, 432, 380, 477, 440, 491, 382, 498, 464, 444, 493, 383, 499, 501, 446, 472, 476, 488, 505, 447, 478, 492, 479, 494, 500, 495, 502, 384, 448, 503, 506, 480, 496, 504} arranged according to their reliabilities, from worst reliability to best reliability.

Thereafter, the least reliable P=32 sub-channels are selected from the above Info_200, and the 32 sub-channels are Bad_32={326, 299, 306, 331, 417, 449, 327, 301, 388, 338, 307, 330, 272, 390, 309, 280, 391, 333, 394, 339, 313, 284, 354, 296, 341, 395, 402, 286, 300, 355, 345, 397}.

Then, P=32 most reliable sub-channels (excluding frozen sub-channels Frozen_10 Shift) are selected from the above Polar code sequence Seq_256. Then, the 32 sub-channels are Good_32={124, 221, 184, 235, 126, 242, 208, 188, 237, 127, 243, 245, 190, 216, 220, 232, 249, 191, 222, 236, 223, 238, 244, 239, 246, 128, 192, 247, 250, 224, 240, 248}. Further, Good_32 may also be obtained by selecting the most reliable P=32 sub-channels Good_32_Shift from the Info_200, then subtracting Good_32_Shift by N. That is, Good_32=Good_32_Shift−N=Good_32_Shift−256, where, Good_32_Shift={380, 477, 440, 491, 382, 498, 464, 444, 493, 383, 499, 501, 446, 472, 476, 488, 505, 447, 478, 492, 479, 494, 500, 495, 502, 384, 448, 503, 506, 480, 496, 504}.

Then, data on Good_32 is made to be the same as data on Bad_32. For simplicity, the data on the sub-channels under the Good_32 set can be copied from the data on the sub-channels under the Bad_32 set.

Thereafter, a Polar code of 2N=512 is used to encode data needed for both new transmission and retransmission, at one time. The sub-channels other than Info_200 and Good_32 are set to frozen bit "0". The sub-block interleaving is then performed using Sub_Block_Interleaver_512. Optionally, the data after the sub-block interleaving is placed in a circular buffer of 2N=512 bits. Thereafter, the first E=250 bits are taken from the circular buffer for the first transmission (new transmission). Then optionally, if the first transmission is unsuccessful e.g. based on HARQ, bits from the N+1=257 to N+E=256+250=506 are taken from the circular buffer for the second transmission (retransmission).

Alternatively, a single encoding (i.e., the scheme described in this embodiment) can be combined with a plurality of encodings (e.g., the scheme described in the first embodiment). The new transmission (i.e., the first transmission) uses a single coding as described in this embodiment, taking a portion of the bits to transmit (e.g., using the first transmitted codeword bits described in this embodiment to transmit). But during retransmission (the second transmission), the scheme described in the first embodiment is used to encode and transmit.

In addition, when a new transmission (i.e., the first transmission) is performed, the scheme described in the first embodiment can be used to encode and transmit. But during retransmission (the second transmission), a single coding as described in this embodiment is used by taking a portion of the bits to transmit (e.g., using the retransmitted codeword bits in the second transmission described in this embodiment to transmit).

Figure 11:
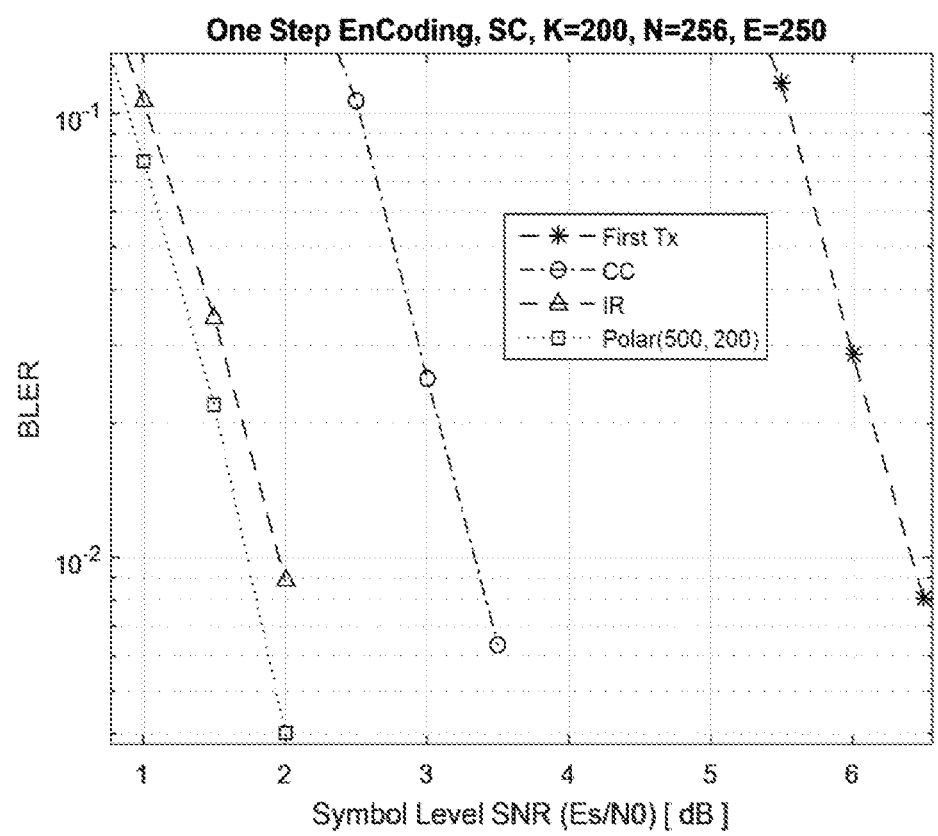
FIG. 11 illustrates still another comparison of exemplary BLER performances of various encoding methods, in accordance with some embodiments of the present disclosure.

FIG. 11 illustrates still another comparison of exemplary BLER performances of various encoding methods, in accordance with the fourth embodiment. As shown in FIG. 11, after using the above method in the fourth embodiment (the line marked with "A" and labeled as "lit" in FIG. 11), it can achieve a gain of 1.38 dB (read at BLER=1%, using SC decoding algorithm and an AWGN channel model) compared to Chase Combination (CC; the line marked with "o" and labeled as "CC" in FIG. 11). At the same time, it can be seen that the performance of the above method in the fourth embodiment is close to a half code rate Polar code (the line marked with "☐" and labeled as "Polar (500, 200)" in FIG. 11).

A fifth embodiment is disclosed based on the following exemplary parameters: the information length K=225 bits (K also included CRC if there is a CRC), the length of the Polar code mother code N=256, the number of bits after rate matching (i.e., the number of bits that the resource can carry) E=240 bits, using 3 or 4 times of transmission (i.e., 2 or 3 times of retransmission), each transmission uses the same E resource bits, P=floor ((((R)/A)*E/B)^2+(((R)/A)^2*E/C))=43 bits are copied during the first retransmission, Q=Floor(1+((D)/A)*E/B)^2+(((D)/A)^2*E/C))=10 bits are copied during the second and third retransmissions, where R=K/E=225/240=15/16, A=563/1024=0.55, B=280, C=17, D=R/2=15/32, floor( ) is the floor function that takes as input a real number x and gives as output the greatest integer less than or equal to x, and ( )^2 is the square operation.

Figure 12:
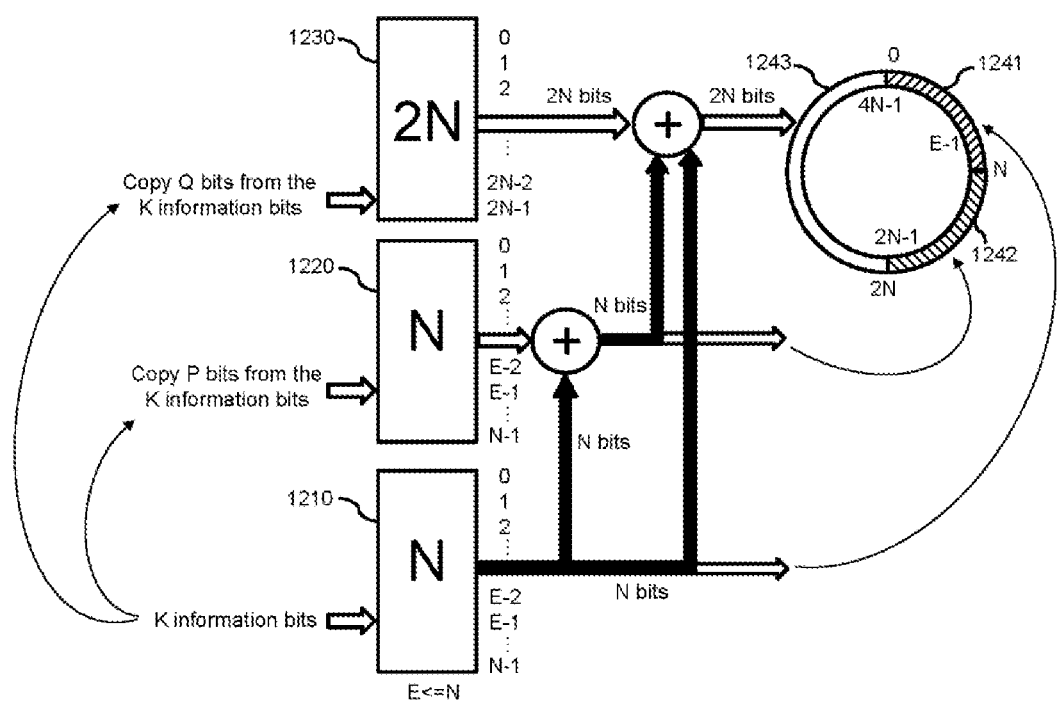
FIG. 12 illustrates another exemplary encoding method based on Polar code, in accordance with some embodiments of the present disclosure.

FIG. 12 illustrates another exemplary encoding method based on Polar code, in accordance with some embodiments of the present disclosure. Since the code rate R>7/16, the embodiment uses a shortening scheme to encode during the first transmission (i.e. the new transmission). That is, the last N−E codeword bits after sub-block interleaving will be known "0" so that these codeword bits with known values are not transmitted.

The encoding in the new transmission is performed in accordance with a conventional Polar code 1210 as shown in the lowest part of FIG. 12. After the encoding is completed (including sub-block interleaving), N codeword bits are written into the first N bits 1241 of a circular buffer with length 4N. In one example, according to the Polar code sequence, for the new transmission, numbers of the sub-channels carrying the K information bits are {129, 13, 34, 66, 21, 35, 25, 37, 8, 130, 67, 12, 41, 69, 131, 20, 14, 49, 15, 73, 22, 133, 36, 27, 81, 38, 26, 23, 137, 39, 97, 68, 42, 145, 29, 70, 43, 50, 75, 161, 193, 71, 45, 132, 82, 51, 74, 16, 134, 53, 24, 135, 77, 138, 83, 57, 28, 98, 40, 85, 139, 146, 30, 44, 99, 89, 141, 31, 147, 72, 162, 46, 101, 52, 149, 47, 76, 105, 163, 54, 194, 153, 78, 165, 55, 84, 58, 113, 136, 79, 195, 86, 59, 169, 140, 100, 87, 61, 90, 197, 142, 102, 148, 177, 143, 32, 201, 91, 150, 103, 106, 164, 93, 48, 209, 151, 154, 166, 107, 56, 114, 155, 80, 109, 225, 167, 196, 60, 170, 115, 157, 88, 198, 117, 171, 62, 178, 92, 199, 173, 121, 202, 63, 144, 104, 179, 94, 203, 108, 181, 152, 210, 95, 205, 156, 211, 110, 185, 116, 168, 226, 158, 111, 118, 213, 172, 227, 217, 159, 119, 174, 122, 200, 180, 229, 175, 123, 204, 64, 182, 233, 125, 206, 183, 212, 186, 207, 96, 214, 187, 228, 112, 215, 189, 218, 230, 160, 120, 219, 231, 234, 176, 124, 221, 184, 235, 126, 208, 188, 237, 127, 190, 216, 220, 232, 191, 222, 236, 223, 238, 239, 128, 192, 224, 240}. All sub-channels were numbered starting from 1. The above sub-channels are ranked according to their reliabilities, from worst reliability to best reliability. Other sub-channels are set to frozen bit "0". The transmitting end transmits the E=240 codeword bits in the circular buffer after the sub-block is interleaved.

For the first retransmission, P=43 bits from sub-channels with the worst sub-channel reliability are copied from the newly transmitted K information bits, and put into the first retransmission data to transmit through the Polar code 1220, as shown in the middle part of FIG. 12. In one example, the P worst reliability sub-channels have numbers of {129, 13, 34, 66, 21, 35, 25, 37, 8, 130, 67, 12, 41, 69, 131, 20, 14, 49, 15, 73, 22, 133, 36, 27, 81, 38, 26, 23, 137, 39, 97, 68, 42, 145, 29, 70, 43, 50, 75, 161, 193, 71, 45} ranked according to their reliabilities, from worst reliability to best reliability.

The first retransmission may use the same encoding scheme as the new transmission. Here, the first retransmission also uses the shortening scheme. That is, the new transmission and the first retransmission use the same sequence, the same sub-block interleaving, and the same puncturing pattern. Then, during the first retransmission, numbers of the sub-channels carrying P information bits are {206, 183, 212, 186, 207, 96, 214, 187, 228, 112, 215, 189, 218, 230, 160, 120, 219, 231, 234, 176, 124, 221, 184, 235, 126, 208, 188, 237, 127, 190, 216, 220, 232, 191, 222, 236, 223, 238, 239, 128, 192, 224, 240} arranged according to their reliabilities, from worst reliability to best reliability. Other sub-channels are set to frozen bits "0".

After the encoding for the first retransmission is completed (including sub-block interleaving), a XOR operation (or modulo 2 addition) may be performed on the encoded data with respect to the newly transmitted N codeword bits to obtain N codeword bits after the exclusive OR operation. Then, the N codeword bits are written into the second N bits 1242 of the circular buffer with length 4N, as shown in FIG. 12. The transmitting end transmits E=240 codeword bits stored in the circular buffer after XOR.

For the second and the third retransmissions (i.e. the third and the fourth transmissions), Q=10 bits from sub-channels with the worst sub-channel reliability are copied from the newly transmitted K information bits, and put into the data of the second and the third retransmissions to transmit through the Polar code 1230, as shown in the upper part of FIG. 12. In another example, Q=10 bits from sub-channels with the worst sub-channel reliability are copied from the P information bits in the first retransmission, and put into the data of the second and the third retransmissions to transmit through the Polar code 1230. In one example, the Q worst reliability sub-channels have numbers of {129, 13, 34, 66, 21, 35, 25, 37, 8, 130} arranged according to their reliabilities, from worst reliability to best reliability, and copied from the newly transmitted K information bits.

The second and the third retransmissions may use the same encoding scheme as the new transmission. Here, the second and the third retransmissions also use the shortening scheme. That is, the first N sub-channels of the 2N sub-channels are set to frozen bit "0" and use the same sub-block interleaving and the same puncturing pattern as the new transmission. The second N sub-channels of the 2N sub-channels use the same sequence, the same sub-block interleaving and the same puncturing pattern as the new transmission. Then, during the second and the third retransmissions, numbers of the sub-channels carrying Q information bits are {191, 222, 236, 223, 238, 239, 128, 192, 224, 240} arranged according to their reliabilities, from worst reliability to best reliability. Other sub-channels are set to frozen bits "0". Alternatively, numbers of the sub-channels carrying Q information bits are {191, 222, 236, 223, 238, 239, 128, 192, 224, 240}+N={447, 478, 492, 479, 494, 495, 384, 448, 480, 496}. That is, sub-channels carrying Q information bits may be confined to the second retransmission (i.e., the third transmission), to make the receiver module be able to decode after receiving the second retransmission and before receiving the third retransmission (i.e., the numbers of sub-channels carrying Q information bits are within the range of the numbers of the codeword bits for the third transmission).

After the encoding for the second and the third retransmissions is completed (including sub-block interleaving), a XOR operation (or modulo 2 addition) may be performed on the encoded data with respect to the newly transmitted N codeword bits and the N codeword bits of the first retransmission to obtain 2N codeword bits after the exclusive OR operation. Then, the obtained 2N codeword bits are written into the second 2N bits 1243 of the circular buffer with length 4N, as shown in FIG. 12. At the third transmission, the transmitting end transmits E=240 codeword bits stored at the third N bits (i.e. bits 2N to 3N−1) in the circular buffer after XOR. At the fourth transmission, the transmitting end transmits E=240 codeword bits stored at the last N bits (i.e. bits 3N to 4N−1) in the circular buffer after XOR.

The receiving end decodes the new transmission. If the decoding is unsuccessful, the receiving end waits for the transmitter to perform a first retransmission (i.e., the second transmission). The receiving end concatenates the retransmitted data with the newly transmitted data to obtain 2N=2*256=512 data (e.g. based on a method same as that in the second embodiment) for decoding, and replaces (or combines) the bits copied from the new transmission with the bits decoded from the first half data (retransmitted data).

If the decoding is still not successful, the receiving end waits for the transmitter to perform a second retransmission (i.e., the third transmission). After receiving data of the second retransmission, the receiving end adds E data of value 0 (a real number value; not binary) in front of the received data of the second retransmission, then adds N−E data of large positive real numbers (e.g., +10000) to obtain 2N=512 data (referred to as first 2N data). This is because the new transmission uses a shortening method, and each retransmission uses the same puncturing pattern as the new transmission. Next, the receiving end concatenates the data of the first retransmission (the second transmission) with the newly transmitted data to obtain 2N=2*256=512 data (referred to as second 2N data), where the newly transmitted data are arranged after the data of the first retransmission. Then, the receiving end concatenates the first 2N data with the second 2N data to obtain 4N=4*256=1024 data for decoding, where the second 2N data are arranged after the first 2N data. During the decoding, the receiving end replaces (or combines) the bits copied from the new transmission with the bits decoded from the first half data (the first 2N data), which includes a replacement or combination to the Q bits in the first retransmission, and a replacement or combination to bits copied from the new transmission using the P bits decoded from the first retransmission.

If the decoding is still unsuccessful, the receiving end waits for the transmitter to perform a third retransmission (i.e., the fourth transmission). First, the receiving end concatenates the data of the third retransmission with the data of the second retransmission to obtain 2N=2*256=512 data (referred to as third 2N data), where the data of the second retransmission are arranged after the data of the third retransmission. Next, the receiving end concatenates the data of the first retransmission (the second transmission) with the newly transmitted data to obtain 2N=2*256=512 data (referred to as fourth 2N data), where the newly transmitted data are arranged after the data of the first retransmission. Then, the receiving end concatenates the third 2N data with the fourth 2N data to obtain 4N=4*256=1024 data for decoding, where the fourth 2N data are arranged after the third 2N data. During the decoding, the receiving end replaces (or combines) the bits copied from the new transmission with the bits decoded from the first half data (the third 2N data), which includes a replacement or combination to the Q bits in the first retransmission, and a replacement or combination to bits copied from the new transmission using the P bits decoded from the first retransmission.

Figure 13:
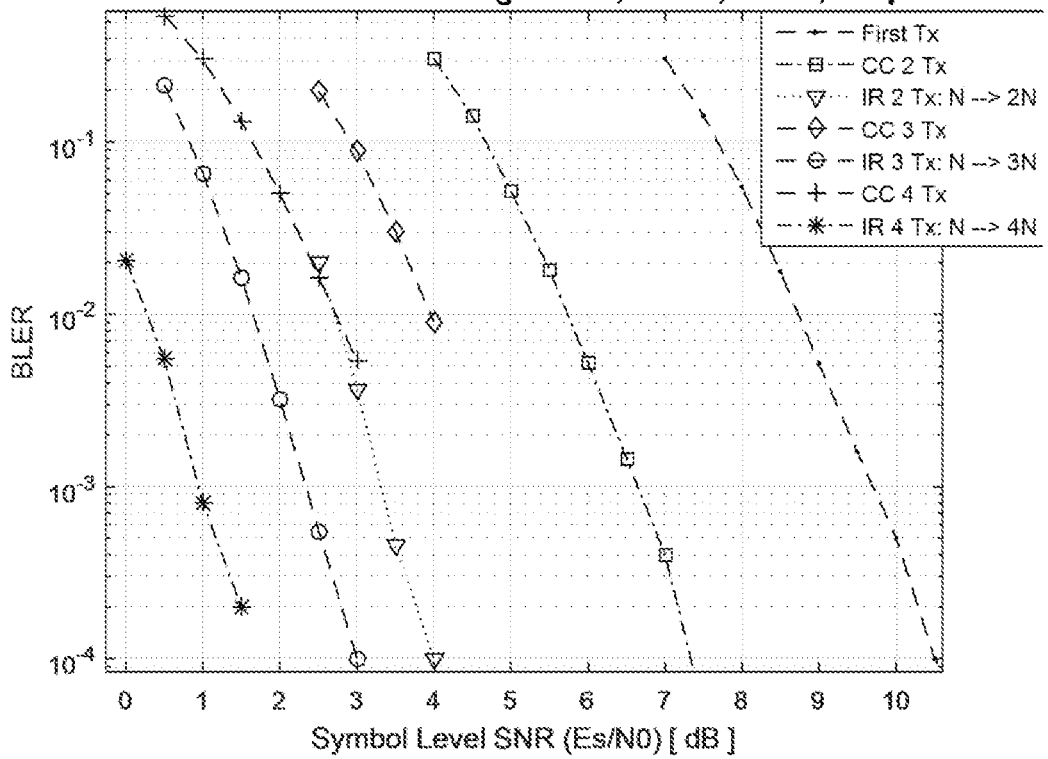
FIG. 13 illustrates a comparison of exemplary BLER performances of various encoding methods including the encoding method shown in FIG. 12, in accordance with some embodiments of the present disclosure.

FIG. 13 illustrates a comparison of exemplary BLER performances of various encoding methods including the encoding method shown in FIG. 12, in accordance with the fifth embodiment. As shown in FIG. 13, after using the above method in the fifth embodiment (List size used for decoding is 1, i.e., SC decoding), if there is one retransmission in total (i.e., a total of two transmissions, the line marked with "∇" and labeled as "IR 2 Tx: N→2N" in FIG. 13), it can achieve a gain of 3 dB (read at BLER=1%, using an AWGN channel model) compared to Chase Combination (CC; the line marked with "□" and labeled as "CC 2 Tx" in FIG. 13). If there are two retransmissions in total (i.e., a total of three transmissions, the line marked with "○" and labeled as "IR 3 Tx: N→3N" in FIG. 13), it can achieve a gain of 2.3 dB compared to Chase Combination (CC; the line marked with "◇" and labeled as "CC 3 Tx" in FIG. 13). If there are three retransmissions in total (i.e., a total of four transmissions, the line marked with "*" and labeled as "IR 4 Tx: N→4N" in FIG. 13), it can achieve a gain of 2.46 dB compared to Chase Combination (CC; the line marked with "+" and labeled as "CC 4 Tx" in FIG. 13).

In addition, the number Q of bits copied during the second and third retransmissions can be calculated by the following formula: $Q=\text{floor}(1+((D)/A)*F/B)^2+(((D)/A)^2*F/C))$; where R=K/E, F=2E, A=563/1024=0.55, B=280, C=17, D=R/2, floor( ) is the floor function that takes as input a real number x and gives as output the greatest integer less than or equal to x, and ( )^2 is the square operation.

Further, the second and third retransmissions may be encoded separately. That is, during the second retransmission, a Polar code with a mother code of length N=256 is used to encode, with Q bits copied. The second retransmission uses the same sequence, the same sub-block interleaving mode, and the same puncturing pattern as the new transmission (first transmission). After the encoding for the second retransmission is completed (including sub-block interleaving), a XOR operation (or modulo 2 addition) may be performed on the encoded data with respect to the newly transmitted N codeword bits to obtain N codeword bits after the exclusive OR operation. Then, the obtained N codeword bits are written into the third N bits of the circular buffer with length 4N. The transmitting end transmits E=240 codeword bits stored at the third N bits (i.e. bits 2N to 3N−1) in the circular buffer after XOR.

During the third retransmission, a Polar code with a mother code of length N=256 is used to encode, with S=ceil(Q/4) bits copied. The third retransmission uses the same sequence, the same sub-block interleaving mode, and the same puncturing pattern as the new transmission (first transmission). After the encoding for the third retransmission is completed (including sub-block interleaving), a XOR operation (or modulo 2 addition) may be performed on the encoded data with respect to N codeword bits, which are results from another XOR operation (or modulo 2 addition) between the N codeword bits of the first retransmission and the newly transmitted N codeword bits, to obtain N codeword bits. Then, the obtained N codeword bits are written into the fourth N bits of the circular buffer with length 4N. The transmitting end transmits E=240 codeword bits stored at the last N bits (i.e. bits 3N to 4N−1) in the circular buffer.

In addition, when performing the third and fourth transmissions, different formulas for determining the number of copied bits can be used at different code rates. For example, the formula listed in the first embodiment may be used after replacing R in the formula with R/2, when the code rate R is within a certain range, e.g. preferably R≥2/3 and optionally R>2/5. In another example, the formula listed in the second embodiment may be used after replacing R in the formula with R/2, when the code rate R is within a certain range, e.g. preferably R<2/3 and optionally R≤2/5.

A sixth embodiment is disclosed based on the following exemplary parameters: the information length K=225 bits (K also included CRC if there is a CRC), the length of the Polar code mother code N=256, the number of bits after rate matching (i.e., the number of bits that the resource can carry) E=240 bits, using two times of transmission (i.e., retransmission one time), each transmission uses the same E resource bits, a 6-bit CRC is used for retransmission, P=floor (K/2)−CRC=106 bits are copied during the retransmission, where CRC=6, floor( ) is the floor function that takes as input a real number x and gives as output the greatest integer less than or equal to x.

Figure 14:
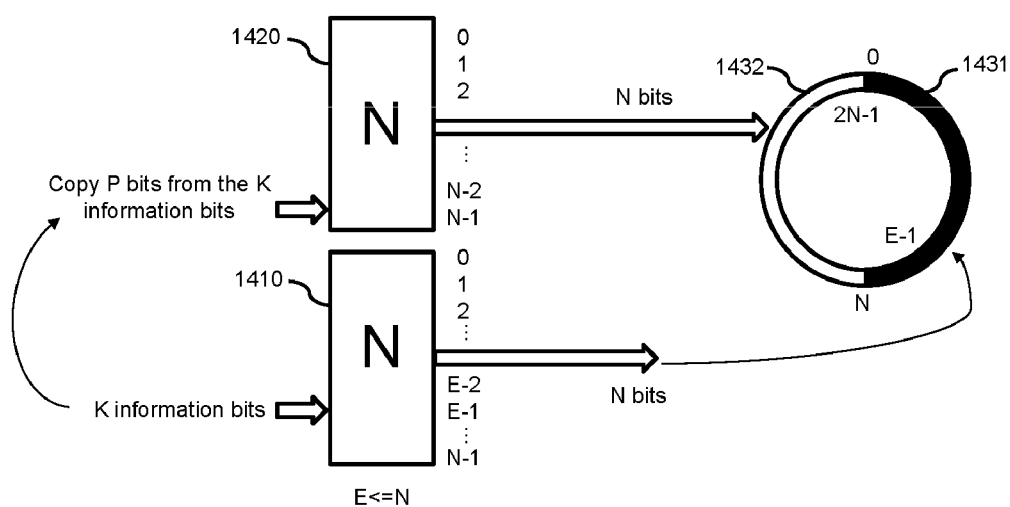
FIG. 14 illustrates yet another exemplary encoding method based on Polar code, in accordance with some embodiments of the present disclosure.

FIG. 14 illustrates yet another exemplary encoding method based on Polar code, in accordance with the sixth embodiment. Since the code rate R>7/16, the first transmission (new transmission) uses a shortening scheme to encode. That is, the last N-E codeword bits after sub-block interleaving will be known "0" so that these codeword bits with known values are not transmitted.

The encoding in the new transmission is performed in accordance with a conventional Polar code 1410 as shown in the lower half of FIG. 14. After the encoding is completed (including sub-block interleaving), N codeword bits are written into the first N bits 1431 of a circular buffer with length 2N. In one example, according to the Polar code sequence, for the new transmission, numbers of the sub-channels carrying the K information bits are {129, 13, 34, 66, 21, 35, 25, 37, 8, 130, 67, 12, 41, 69, 131, 20, 14, 49, 15, 73, 22, 133, 36, 27, 81, 38, 26, 23, 137, 39, 97, 68, 42, 145, 29, 70, 43, 50, 75, 161, 193, 71, 45, 132, 82, 51, 74, 16, 134, 53, 24, 135, 77, 138, 83, 57, 28, 98, 40, 85, 139, 146, 30, 44, 99, 89, 141, 31, 147, 72, 162, 46, 101, 52, 149, 47, 76, 105, 163, 54, 194, 153, 78, 165, 55, 84, 58, 113, 136, 79, 195, 86, 59, 169, 140, 100, 87, 61, 90, 197, 142, 102, 148, 177, 143, 32, 201, 91, 150, 103, 106, 164, 93, 48, 209, 151, 154, 166, 107, 56, 114, 155, 80, 109, 225, 167, 196, 60, 170, 115, 157, 88, 198, 117, 171, 62, 178, 92, 199, 173, 121, 202, 63, 144, 104, 179, 94, 203, 108, 181, 152, 210, 95, 205, 156, 211, 110, 185, 116, 168, 226, 158, 111, 118, 213, 172, 227, 217, 159, 119, 174, 122, 200, 180, 229, 175, 123, 204, 64, 182, 233, 125, 206, 183, 212, 186, 207, 96, 214, 187, 228, 112, 215, 189, 218, 230, 160, 120, 219, 231, 234, 176, 124, 221, 184, 235, 126, 208, 188, 237, 127, 190, 216, 220, 232, 191, 222, 236, 223, 238, 239, 128, 192, 224, 240}. The above sub-channels are ranked according to their reliabilities, from worst reliability to best reliability. Other sub-channels are set to frozen bit "0". The transmitting end transmits the E=240 codeword bits in the first half of the circular buffer after the sub-block is interleaved.

For retransmission, first, P=106 bits from sub-channels with the worst sub-channel reliability are copied from the newly transmitted K information bits, and put into the retransmission data to transmit through the Polar code 1420, as shown in the upper part of FIG. 14. In one example, the P worst reliability sub-channels have numbers of {129, 13, 34, 66, 21, 35, 25, 37, 8, 130, 67, 12, 41, 69, 131, 20, 14, 49, 15, 73, 22, 133, 36, 27, 81, 38, 26, 23, 137, 39, 97, 68, 42, 145, 29, 70, 43, 50, 75, 161, 193, 71, 45, 132, 82, 51, 74, 16, 134, 53, 24, 135, 77, 138, 83, 57, 28, 98, 40, 85, 139, 146, 30, 44, 99, 89, 141, 31, 147, 72, 162, 46, 101, 52, 149, 47, 76, 105, 163, 54, 194, 153, 78, 165, 55, 84, 58, 113, 136, 79, 195, 86, 59, 169, 140, 100, 87, 61, 90, 197, 142, 102, 148, 177, 143, 32}, ranked according to their reliabilities, from worst reliability to best reliability.

The retransmission may use a different encoding scheme from that of the new transmission. Here, the retransmission uses a Puncturing method. That is, the new transmission and the retransmission use the same sequence, the same sub-block interleaving, but different puncturing patterns. Then, during retransmission, numbers of the sub-channels carrying P+CRC=112 information bits are {115, 157, 88, 198, 117, 171, 62, 178, 92, 199, 173, 121, 202, 63, 144, 104, 179, 94, 203, 108, 181, 152, 210, 95, 205, 156, 211, 110, 185, 116, 168, 226, 158, 111, 118, 213, 172, 227, 217, 159, 119, 174, 122, 200, 180, 229, 175, 123, 204, 64, 182, 233, 125, 206, 183, 212, 186, 241, 207, 96, 214, 187, 228, 112, 215, 189, 218, 230, 160, 120, 219, 231, 234, 176, 124, 221, 184, 235, 126, 242, 208, 188, 237, 127, 243, 245, 190, 216, 220, 232, 249, 191, 222, 236, 223, 238, 244, 239, 246, 128, 192, 247, 250, 251, 253, 224, 240, 252, 248, 254, 255, 256} arranged according to their reliabilities, from worst reliability to best reliability. Other sub-channels are set to frozen bits "0".

After the encoding for retransmission is completed (including sub-block interleaving), the N codeword bits are written into the second N bits 1432 of the circular buffer with length 2N, as shown in FIG. 14. The transmitting end transmits E=240 codeword bits stored in the latter half of the circular buffer after the encoding for retransmission is completed.

The receiving end decodes the new transmission. If the decoding is unsuccessful, the receiving end waits for the transmitter to retransmit data. The receiving end decodes the retransmitted data. If the decoding is successful (i.e., the CRC passes), the bits copied from the new transmission are replaced (or combined) by the bits decoded from the retransmission.

Figure 15:
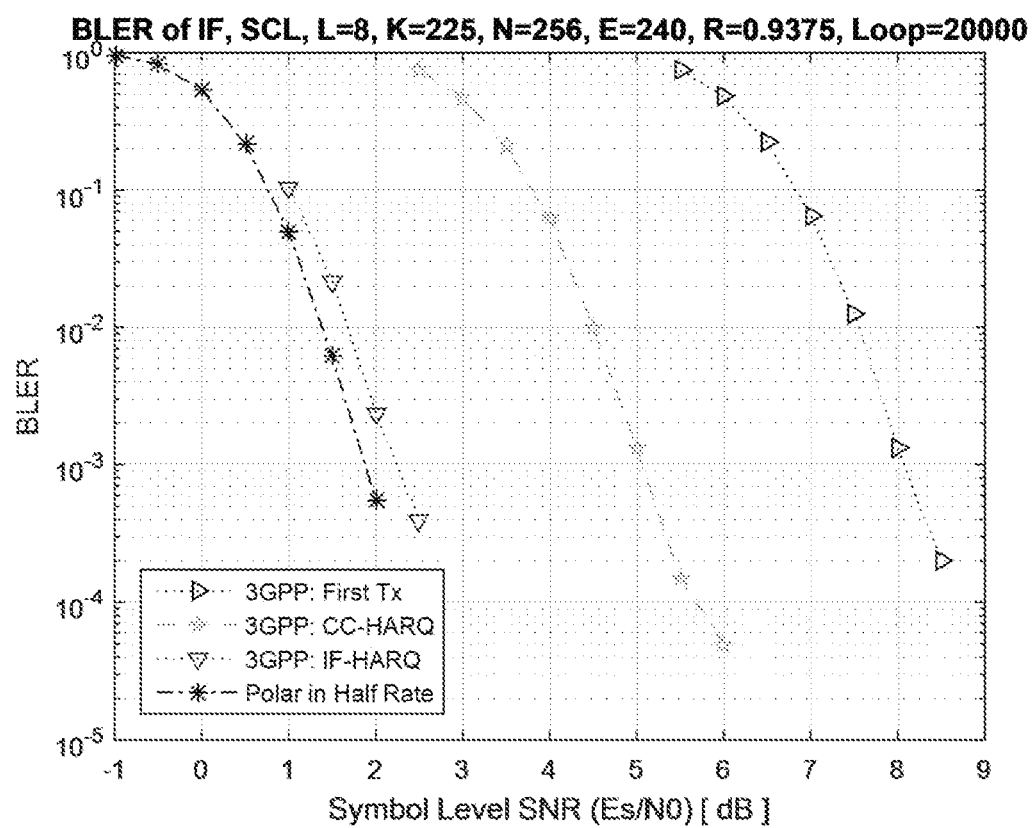
FIG. 15 illustrates a comparison of exemplary BLER performances of various encoding methods including the encoding method shown in FIG. 14, in accordance with some embodiments of the present disclosure.

FIG. 15 illustrates a comparison of exemplary BLER performances of various encoding methods including the encoding method shown in FIG. 14, in accordance with the sixth embodiment. As shown in FIG. 15, after using the above method in the sixth embodiment (List size used for decoding is 8, the line marked with "∇" and labeled as "3GPP: IF-HARQ" in FIG. 15), it can achieve a gain of 2.9 dB compared to Chase Combination (CC; the line marked with five-pointed stars and labeled as "3GPP: CC-HARQ" in FIG. 15). At the same time, it can be seen that the performance of the above method in the sixth embodiment is close to the performance of a Polar code with a half code rate (the line marked with "*" and labeled as "Polar in Half Rate" in FIG. 15).

If there is no CRC (and no parity PC bit), P=floor (K/2) bits can be copied from the new transmission during retransmission. If there is only PC bit, then P=floor(K/2)−CRC bits can be copied from the new transmission during retransmission, where CRC is taken as the number of PC bits. If there are both CRC and PC (e.g. CRC is first applied on the copied data, and then PC is applied on the copied data and CRC), P=floor(K/2)−CRC−PC bits can be copied from the new transmission during retransmission. If the number of PC bits is classified into the CRC bits, P=floor (K/2)−CRC bits can be copied from the new transmission during retransmission, where the CRC contains the number of PC bits. Further, the CRC may be the number of bits of the cyclic redundancy check for the copied data. Optionally, the CRC is the number of bits for the parity of the copied data. Optionally, the CRC is the sum of the number of bits of the cyclic redundancy check and the number of bits of the parity. Optionally, K does not contain the number of bits of the CRC. Optionally, K contains the number of bits of the CRC.

Figure 16:
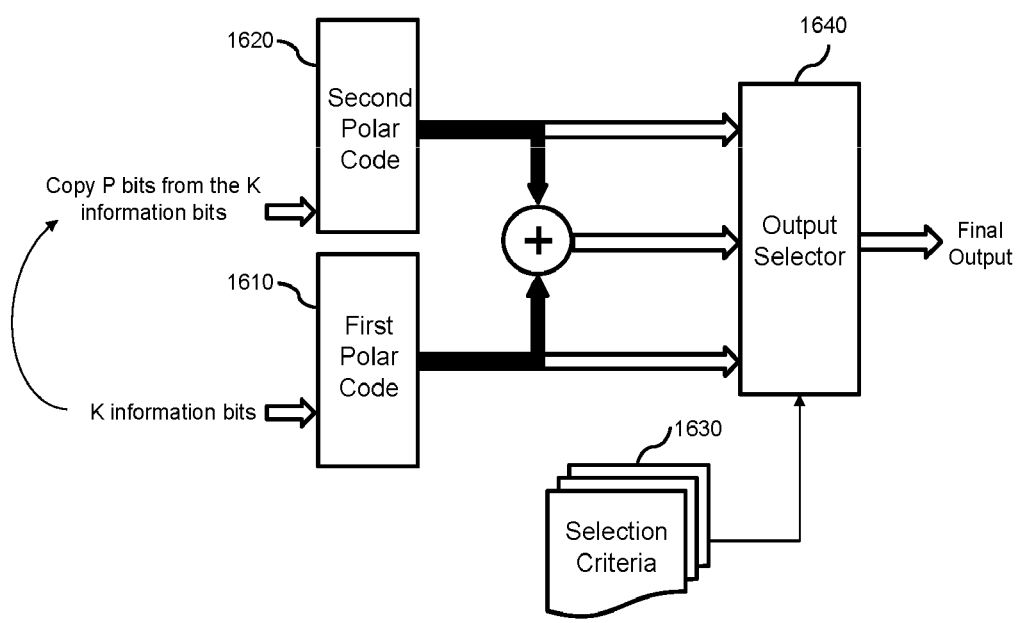
FIG. 16 illustrates still another exemplary encoding method based on Polar code, in accordance with some embodiments of the present disclosure.

FIG. 16 illustrates still another exemplary encoding method based on Polar code, in accordance with a seventh embodiment. As shown in FIG. 16, the seventh embodiment describes how to select the final output codeword bits based on two exemplary Polar codes.

First, the first Polar code 1610 is concatenated with the second Polar code 1620. In one example, the first Polar code 1610 has a mother code with a length N=1024; and the second Polar code 1620 has a mother code with a length which may or may not be N=1024. Either an output of the first Polar code, or a combined output of the first Polar code and the second Polar code can be selected as the final output codeword, based on one or more of at least the following conditions: a redundancy version, a transmission number, a code rate, a code length, an information packet length, a link direction, a channel type, a downlink control information format, a search space, a scrambling mode, and a terminal capability.

When both the first Polar code 1610 and the second Polar code 1620 output E=N=1024 codeword bits, the modulo 2 addition (or XOR) in FIG. 16 will generate 1024 codeword bits. In this way, the outputs to be selected include three codewords each having 1024 bits. The output selector 1640 will select one or more of the outputs as the final output based on one or more of the selection criteria 1630.

If the two Polar codes output codeword bits with different lengths, a portion of the codeword bits of the longer Polar code may be selected and used to perform a modulo 2 addition with the codeword bits of the other and shorter Polar code.

Different selection criteria 1630 may include different selection conditions for selecting different outputs. For example, the output selector 1640 may select the output of the first Polar code 1610 as a final output under a first condition; and select a combination of the outputs of the first Polar code 1610 and the second Polar code 1620 as the final output under a second condition. For example, when a selection criterion is a redundancy version, the first condition is that the current redundancy version is a first redundancy version RV 0, and the second condition is that the current redundancy version is a second redundancy version RV 1. If the current redundancy version is the RV 0, then the output selector 1640 selects the output of the first Polar code 1610 as a final output; if the current redundancy version is the RV 1, then the output selector 1640 selects a combination (e.g. a modulo 2 addition) of the outputs of the first Polar code 1610 and the second Polar code 1620 as the final output.

In addition, the first condition and the second condition may also be: (a) the first condition is that the current transmission is a new transmission, and the second condition is that the current transmission is the first retransmission; (b) the first condition is that the current transmission is the first transmission, and the second condition is that the current transmission is the second transmission; (c) the first condition is that the current transmission is an odd number of transmissions, and the second condition is that the current transmission is an even number of transmissions; (d) the first condition is that the code rate $R \geq R0$, and the second condition is the code rate $R < R0$, and R0 is a code rate threshold, e.g. $R0=1/2$; (e) the first condition is that the Polar code mother code length $N \leq N0$, and the second condition is that the Polar code mother code length $N > N0$, and N0 is a Polar code mother code length threshold, e.g. $N0=1024$; (f) the first condition is that the length of the information packet to be encoded is $K < K0$, and the second condition is that the length of the information packet to be encoded is $K \geq K0$. K0 is the length threshold of the information packet to be encoded, e.g. $K0=1024$ or $K0=1024-CRC$, where CRC is the length of the CRC (e.g., CRC=11, then K0=1013); (g) the first condition is that the link direction is downlink, and the second condition is that the link direction is uplink; (h) the first condition is that the channel type is a physical control channel, and the second condition is a physical downlink shared channel or a physical uplink shared channel; (i) the first condition is that the downlink control information format is format 0_0 or format 1_0, and the second condition is a downlink control information format other than the initial format 0_0 and the format 1_0; (j) the first condition is that the search space is a cell-specific search space, and the second condition is that the search space is a user-specific search space; (k) the first condition is that the scrambling mode is scrambling using the cell radio network temporary identifier, and the second condition is that the scrambling mode is scrambling using the radio network temporary identifier except the cell radio network temporary identifier; (l) the first condition is that the terminal capability supports limited buffer rate matching, and the second condition is that the terminal capability does not support the limited buffer rate matching.

In this embodiment, a combination of the outputs of the first Polar code 1610 and the second Polar code 1620 may comprise one of the following: (a) a modulo 2 addition operation or XOR operation is performed on the outputs of the first Polar code 1610 and the second Polar code 1620 to obtain a certain codeword as a final output; (b) concatenating the obtained codeword in (a) with the output of the first Polar code 1610 to generate a concatenated output as a final output; (c) concatenating the obtained codeword in (a) with the output of the second Polar code 1620 to generate a concatenated output as a final output; and (d) concatenating the output of the first Polar code 1610 and the output of the second Polar code 1620 to generate a concatenated output as a final output.

In this embodiment, the encoding method for the first Polar code 1610 and the second Polar code 1620 may comprise any one of the following: P bits to be encoded in the second Polar code 1620 come from P bits in the first Polar code 1610. The P bits in the first Polar code 1610 may refer to data carried by the P sub-channels with the worst reliability; and the P bits to be encoded in the second Polar code 1620 may refer to data carried by the P sub-channels with the best reliability. The number P of copied bits may be determined based on any of the above embodiments (the first embodiment to the sixth embodiment).

An eighth embodiment is disclosed based on the following exemplary parameters: the information length K=240 bits, the length of the Polar code mother code N=512, the number of bits after rate matching (i.e., the number of bits that the resource can carry) E=270 bits, using two times of transmission (i.e., one time for retransmission, one time for new transmission), each transmission uses the same E resource bits, $P=\text{floor}(((R/A)*E/B)^2+((R/A)^2)*E/C)=43$ bits are copied during the retransmission, where R=K/E=240/270=8/9, A=563/1024=0.55, B=280, C=17, floor( ) is the floor function that takes as input a real number x and gives as output the greatest integer less than or equal to x, and ( )^2 is the square operation.

Since the code rate R>7/16, the first transmission (i.e., new transmission) will be encoded using shortening scheme (i.e., the last N−E codeword bits after sub-block interleaving will not be transmitted, and the first E codeword bits after sub-block interleaving will be transmitted).

The encoding in the new transmission is performed in accordance with a conventional Polar code 510 as shown in the lower half of FIG. 5 but with different sub-block interleaving pattern. This kind of sub-block interleaving pattern is generated as the following.

A sub-block interleaving pattern Sub_Block_2N with length 2N=1024 is generated according to the following table and formula.

| i | P(i) | i | P(i) | i | P(i) | i | P(i) | i | P(i) | i | P(i) | i | P(i) | i | P(i) |
|---|------|---|------|---|------|---|------|---|------|---|------|---|------|---|------|
| 0 | 0 | 4 | 3 | 8 | 8 | 12 | 10 | 16 | 12 | 20 | 14 | 24 | 24 | 28 | 27 |
| 1 | 1 | 5 | 5 | 9 | 16 | 13 | 18 | 17 | 20 | 21 | 22 | 25 | 25 | 29 | 29 |
| 2 | 2 | 6 | 6 | 10 | 9 | 14 | 11 | 18 | 13 | 22 | 15 | 26 | 26 | 30 | 30 |
| 3 | 4 | 7 | 7 | 11 | 17 | 15 | 19 | 19 | 21 | 23 | 23 | 27 | 28 | 31 | 31 | for n = 0 to N − 1
    $i = \lfloor 32n / N \rfloor$;
    $J(n) = P(i) \times (N / 32) + \text{mod}(n, N / 32)$;
    $y_n = d_{J(n)}$;
end for With this method, the Sub_Block_2N is Sub_Block_2N={1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 129, 130, 131, 132, 133, 134, 135, 136, 137, 138, 139, 140, 141, 142, 143, 144, 145, 146, 147, 148, 149, 150, 151, 152, 153, 154, 155, 156, 157, 158, 159, 160, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 161, 162, 163, 164, 165, 166, 167, 168, 169, 170, 171, 172, 173, 174, 175, 176, 177, 178, 179, 180, 181, 182, 183, 184, 185, 186, 187, 188, 189, 190, 191, 192, 193, 194, 195, 196, 197, 198, 199, 200, 201, 202, 203, 204, 205, 206, 207, 208, 209, 210, 211, 212, 213, 214, 215, 216, 217, 218, 219, 220, 221, 222, 223, 224, 225, 226, 227, 228, 229, 230, 231, 232, 233, 234, 235, 236, 237, 238, 239, 240, 241, 242, 243, 244, 245, 246, 247, 248, 249, 250, 251, 252, 253, 254, 255, 256, 257, 258, 259, 260, 261, 262, 263, 264, 265, 266, 267, 268, 269, 270, 271, 272, 273, 274, 275, 276, 277, 278, 279, 280, 281, 282, 283, 284, 285, 286, 287, 288, 513, 514, 515, 516, 517, 518, 519, 520, 521, 522, 523, 524, 525, 526, 527, 528, 529, 530, 531, 532, 533, 534, 535, 536, 537, 538, 539, 540, 541, 542, 543, 544, 289, 290, 291, 292, 293, 294, 295, 296, 297, 298, 299, 300, 301, 302, 303, 304, 305, 306, 307, 308, 309, 310, 311, 312, 313, 314, 315, 316, 317, 318, 319, 320, 545, 546, 547, 548, 549, 550, 551, 552, 553, 554, 555, 556, 557, 558, 559, 560, 561, 562, 563, 564, 565, 566, 567, 568, 569, 570, 571, 572, 573, 574, 575, 576, 321, 322, 323, 324, 325, 326, 327, 328, 329, 330, 331, 332, 333, 334, 335, 336, 337, 338, 339, 340, 341, 342, 343, 344, 345, 346, 347, 348, 349, 350, 351, 352, 577, 578, 579, 580, 581, 582, 583, 584, 585, 586, 587, 588, 589, 590, 591, 592, 593, 594, 595, 596, 597, 598, 599, 600, 601, 602, 603, 604, 605, 606, 607, 608, 353, 354, 355, 356, 357, 358, 359, 360, 361, 362, 363, 364, 365, 366, 367, 368, 369, 370, 371, 372, 373, 374, 375, 376, 377, 378, 379, 380, 381, 382, 383, 384, 609, 610, 611, 612, 613, 614, 615, 616, 617, 618, 619, 620, 621, 622, 623, 624, 625, 626, 627, 628, 629, 630, 631, 632, 633, 634, 635, 636, 637, 638, 639, 640, 385, 386, 387, 388, 389, 390, 391, 392, 393, 394, 395, 396, 397, 398, 399, 400, 401, 402, 403, 404, 405, 406, 407, 408, 409, 410, 411, 412, 413, 414, 415, 416, 641, 642, 643, 644, 645, 646, 647, 648, 649, 650, 651, 652, 653, 654, 655, 656, 657, 658, 659, 660, 661, 662, 663, 664, 665, 666, 667, 668, 669, 670, 671, 672, 417, 418, 419, 420, 421, 422, 423, 424, 425, 426, 427, 428, 429, 430, 431, 432, 433, 434, 435, 436, 437, 438, 439, 440, 441, 442, 443, 444, 445, 446, 447, 448, 673, 674, 675, 676, 677, 678, 679, 680, 681, 682, 683, 684, 685, 686, 687, 688, 689, 690, 691, 692, 693, 694, 695, 696, 697, 698, 699, 700, 701, 702, 703, 704, 449, 450, 451, 452, 453, 454, 455, 456, 457, 458, 459, 460, 461, 462, 463, 464, 465, 466, 467, 468, 469, 470, 471, 472, 473, 474, 475, 476, 477, 478, 479, 480, 705, 706, 707, 708, 709, 710, 711, 712, 713, 714, 715, 716, 717, 718, 719, 720, 721, 722, 723, 724, 725, 726, 727, 728, 729, 730, 731, 732, 733, 734, 735, 736, 481, 482, 483, 484, 485, 486, 487, 488, 489, 490, 491, 492, 493, 494, 495, 496, 497, 498, 499, 500, 501, 502, 503, 504, 505, 506, 507, 508, 509, 510, 511, 512, 737, 738, 739, 740, 741, 742, 743, 744, 745, 746, 747, 748, 749, 750, 751, 752, 753, 754, 755, 756, 757, 758, 759, 760, 761, 762, 763, 764, 765, 766, 767, 768, 769, 770, 771, 772, 773, 774, 775, 776, 777, 778, 779, 780, 781, 782, 783, 784, 785, 786, 787, 788, 789, 790, 791, 792, 793, 794, 795, 796, 797, 798, 799, 800, 801, 802, 803, 804, 805, 806, 807, 808, 809, 810, 811, 812, 813, 814, 815, 816, 817, 818, 819, 820, 821, 822, 823, 824, 825, 826, 827, 828, 829, 830, 831, 832, 833, 834, 835, 836, 837, 838, 839, 840, 841, 842, 843, 844, 845, 846, 847, 848, 849, 850, 851, 852, 853, 854, 855, 856, 857, 858, 859, 860, 861, 862, 863, 864, 897, 898, 899, 900, 901, 902, 903, 904, 905, 906, 907, 908, 909, 910, 911, 912, 913, 914, 915, 916, 917, 918, 919, 920, 921, 922, 923, 924, 925, 926, 927, 928, 865, 866, 867, 868, 869, 870, 871, 872, 873, 874, 875, 876, 877, 878, 879, 880, 881, 882, 883, 884, 885, 886, 887, 888, 889, 890, 891, 892, 893, 894, 895, 896, 929, 930, 931, 932, 933, 934, 935, 936, 937, 938, 939, 940, 941, 942, 943, 944, 945, 946, 947, 948, 949, 950, 951, 952, 953, 954, 955, 956, 957, 958, 959, 960, 961, 962, 963, 964, 965, 966, 967, 968, 969, 970, 971, 972, 973, 974, 975, 976, 977, 978, 979, 980, 981, 982, 983, 984, 985, 986, 987, 988, 989, 990, 991, 992, 993, 994, 995, 996, 997, 998, 999, 1000, 1001, 1002, 1003, 1004, 1005, 1006, 1007, 1008, 1009, 1010, 1011, 1012, 1013, 1014, 1015, 1016, 1017, 1018, 1019, 1020, 1021, 1022, 1023, 1024}.

A sub-block interleaving pattern Sub_Block_2N Last Half with a length N is extracted from the second half of Sub_Block_2N. Hence, it will be Sub_Block_2N Last Half={385, 386, 387, 388, 389, 390, 391, 392, 393, 394, 395, 396, 397, 398, 399, 400, 401, 402, 403, 404, 405, 406, 407, 408, 409, 410, 411, 412, 413, 414, 415, 416, 641, 642, 643, 644, 645, 646, 647, 648, 649, 650, 651, 652, 653, 654, 655, 656, 657, 658, 659, 660, 661, 662, 663, 664, 665, 666, 667, 668, 669, 670, 671, 672, 417, 418, 419, 420, 421, 422, 423, 424, 425, 426, 427, 428, 429, 430, 431, 432, 433, 434, 435, 436, 437, 438, 439, 440, 441, 42, 443, 444, 445, 446, 447, 448, 673, 674, 675, 676, 677, 678, 679, 680, 681, 682, 683, 684, 685, 686, 687, 688, 689, 690, 691, 692, 693, 694, 695, 696, 697, 698, 699, 700, 701, 702, 703, 704, 449, 450, 451, 452, 453, 454, 455, 456, 457, 458, 459, 460, 461, 462, 463, 464, 465, 466, 467, 468, 469, 470, 471, 472, 473, 474, 475, 476, 477, 478, 479, 480, 705, 706, 707, 708, 709, 710, 711, 712, 713, 714, 715, 716, 717, 718, 719, 720, 721, 722, 723, 724, 725, 726, 727, 728, 729, 730, 731, 732, 733, 734, 735, 736, 481, 482, 483, 484, 485, 486, 487, 488, 489, 490, 491, 492, 493, 494, 495, 496, 497, 498, 499, 500, 501, 502, 503, 504, 505, 506, 507, 508, 509, 510, 511, 512, 737, 738, 739, 740, 741, 742, 743, 744, 745, 746, 747, 748, 749, 750, 751, 752, 753, 754, 755, 756, 757, 758, 759, 760, 761, 762, 763, 764, 765, 766, 767, 768, 769, 770, 771, 772, 773, 774, 775, 776, 777, 778, 779, 780, 781, 782, 783, 784, 785, 786, 787, 788, 789, 790, 791, 792, 793, 794, 795, 796, 797, 798, 799, 800, 801, 802, 803, 804, 805, 806, 807, 808, 809, 810, 811, 812, 813, 814, 815, 816, 817, 818, 819, 820, 821, 822, 823, 824, 825, 826, 827, 828, 829, 830, 831, 832, 833, 834, 835, 836, 837, 838, 839, 840, 841, 842, 843, 844, 845, 846, 847, 848, 849, 850, 851, 852, 853, 854, 855, 856, 857, 858, 859, 860, 861, 862, 863, 864, 897, 898, 899, 900, 901, 902, 903, 904, 905, 906, 907, 908, 909, 910, 911, 912, 913, 914, 915, 916, 917, 918, 919, 920, 921, 922, 923, 924, 925, 926, 927, 928, 865, 866, 867, 868, 869, 870, 871, 872, 873, 874, 875, 876, 877, 878, 879, 880, 881, 882, 883, 884, 885, 886, 887, 888, 889, 890, 891, 892, 893, 894, 895, 896, 929, 930, 931, 932, 933, 934, 935, 936, 937, 938, 939, 940, 941, 942, 943, 944, 945, 946, 947, 948, 949, 950, 951, 952, 953, 954, 955, 956, 957, 958, 959, 960, 961, 962, 963, 964, 965, 966, 967, 968, 969, 970, 971, 972, 973, 974, 975, 976, 977, 978, 979, 980, 981, 982, 983, 984, 985, 986, 987, 988, 989, 990, 991, 992, 993, 994, 995, 996, 997, 998, 999, 1000, 1001, 1002, 1003, 1004, 1005, 1006, 1007, 1008, 1009, 1010, 1011, 1012, 1013, 1014, 1015, 1016, 1017, 1018, 1019, 1020, 1021, 1022, 1023, 1024}.

It should be noted that, if the coding rate is less than or equal to 7/16, then, the first half (i.e., the first N elements) will be selected.

For each element, a sub-block interleaving pattern Sub_Block_N with length N is reached by subtracting Sub_Block_2N_Last_Half by a length N of a mother Polar code. Hence, it will be Sub_Block_N=Sub_Block_2N_Last_Half−N. That is, Sub_Block_N={−127, −126, −125, −124, −123, −122, −121, −120, −119, −118, −117, −116, −115, −114, −113, −112, −111, −110, −109, −108, −107, −106, −105, −104, −103, −102, −101, −100, −99, −98, −97, −96, 129, 130, 131, 132, 133, 134, 135, 136, 137, 138, 139, 140, 141, 142, 143, 144, 145, 146, 147, 148, 149, 150, 151, 52, 153, 154, 155, 156, 157, 158, 159, 160, −95, −94, −93, −92, −91, −90, −89, −88, −87, −86, −85, −84, −83, −82, −81, −80, −79, −78, −77, −76, −75, −74, −73, −72, −71, −70, −69, −68, −67, −66, −65, −64, 161, 162, 163, 164, 165, 166, 167, 168, 169, 170, 171, 172, 173, 174, 175, 176, 177, 178, 179, 180, 181, 182, 183, 84, 185, 186, 187, 188, 189, 190, 191, 192, −63, −62, −61, −60, −59, −58, −57, −56, −55, −54, −53, −52, −51, −50, −49, −48, −47, −46, −45, −44, −43, −42, −41, −40, −39, −38, −37, −36, −35, −34, −33, −32, 193, 194, 195, 196, 197, 198, 199, 200, 201, 202, 203, 204, 205, 206, 207, 208, 209, 210, 211, 212, 213, 214, 215, 216, 217, 218, 219, 220, 221, 222, 223, 224, −31, −30, −29, −28, −27, −26, −25, −24, −23, −22, −21, −20, −19, −18, −17, −16, −15, −14, −13, −12, −11, −10, −9, −8, −7, −6, −5, −4, −3, −2, −1, 0, 225, 226, 227, 228, 229, 230, 231, 232, 233, 234, 235, 236, 237, 238, 239, 240, 241, 242, 243, 244, 245, 246, 247, 248, 249, 250, 251, 252, 253, 254, 255, 256, 257, 258, 259, 260, 261, 262, 263, 264, 265, 266, 267, 268, 269, 270, 271, 272, 273, 274, 275, 276, 277, 278, 279, 280, 281, 282, 283, 284, 285, 286, 287, 288, 289, 290, 291, 292, 293, 294, 295, 296, 297, 298, 299, 300, 301, 302, 303, 304, 305, 306, 307, 308, 309, 310, 311, 312, 313, 314, 315, 316, 317, 318, 319, 320, 321, 322, 323, 324, 325, 326, 327, 328, 329, 330, 331, 332, 333, 334, 335, 336, 337, 338, 339, 340, 341, 342, 343, 344, 345, 346, 347, 348, 349, 350, 351, 352, 385, 386, 387, 388, 389, 390, 391, 392, 393, 394, 395, 396, 397, 398, 399, 400, 401, 402, 403, 404, 405, 406, 407, 408, 409, 410, 411, 412, 413, 414, 415, 416, 353, 354, 355, 356, 357, 358, 359, 360, 361, 362, 363, 364, 365, 366, 367, 368, 369, 370, 371, 372, 373, 374, 375, 376, 377, 378, 379, 380, 381, 382, 383, 384, 417, 418, 419, 420, 421, 422, 423, 424, 425, 426, 427, 428, 429, 430, 431, 432, 433, 434, 435, 436, 437, 438, 439, 440, 441, 442, 443, 444, 445, 446, 447, 448, 449, 450, 451, 452, 453, 454, 455, 456, 457, 458, 459, 460, 461, 462, 463, 464, 465, 466, 467, 468, 469, 470, 471, 472, 473, 474, 475, 476, 477, 478, 479, 480, 481, 482, 483, 484, 485, 486, 487, 488, 489, 490, 491, 492, 493, 494, 495, 496, 497, 498, 499, 500, 501, 502, 503, 504, 505, 506, 507, 508, 509, 510, 511, 512}.

It should be noted that, if the coding rate is less than or equal to 7/16, then, there is no such operation of subtraction described above.

For each element in the sub-block interleaving pattern above Sub_Block_N, if it were zero or negative, then it will be marked as "Unavailable". For example, it will be marked as "−1". Hence, a sub-block interleaving pattern Sub_Block_N_New is got as Sub_Block_N_New={−1, −1, −1, −1, −1, −1, −1, −1, −1, −1, −1, −1, −1, −1, −1, −1, −1, −1, −1, −1, −1, −1, −1, −1, −1, −1, −1, −1, −1, −1, −1, −1, 129, 130, 131, 132, 133, 134, 135, 136, 137, 138, 139, 140, 141, 142, 143, 144, 145, 146, 147, 148, 149, 150, 151, 52, 153, 154, 155, 156, 157, 158, 159, 160, −1, −1, −1, −1, −1, −1, −1, −1, −1, −1, −1, −1, −1, −1, −1, −1, −1, −1, −1, −1, −1, −1, −1, −1, −1, −1, −1, −1, −1, −1, −1, −1, 161, 162, 163, 164, 165, 166, 167, 168, 169, 170, 171, 172, 173, 174, 175, 176, 177, 178, 179, 180, 181, 182, 183, 84, 185, 186, 187, 188, 189, 190, 191, 192, −1, −1, −1, −1, −1, −1, −1, −1, −1, −1, −1, −1, −1, −1, −1, −1, −1, −1, −1, −1, −1, −1, −1, −1, −1, −1, −1, −1, −1, −1, −1, −1, 193, 194, 195, 196, 197, 198, 199, 200, 201, 202, 203, 204, 205, 206, 207, 208, 209, 210, 211, 212, 213, 214, 215, 216, 217, 218, 219, 220, 221, 222, 223, 224, −1, −1, −1, −1, −1, −1, −1, −1, −1, −1, −1, −1, −1, −1, −1, −1, −1, −1, −1, −1, −1, −1, −1, −1, −1, −1, −1, −1, −1, −1, −1, −1, 225, 226, 227, 228, 229, 230, 231, 232, 233, 234, 235, 236, 237, 238, 239, 240, 241, 242, 243, 244, 245, 246, 247, 248, 249, 250, 251, 252, 253, 254, 255, 256, 257, 258, 259, 260, 261, 262, 263, 264, 265, 266, 267, 268, 269, 270, 271, 272, 273, 274, 275, 276, 277, 278, 279, 280, 281, 282, 283, 284, 285, 286, 287, 288, 289, 290, 291, 292, 293, 294, 295, 296, 297, 298, 299, 300, 301, 302, 303, 304, 305, 306, 307, 308, 309, 310, 311, 312, 313, 314, 315, 316, 317, 318, 319, 320, 321, 322, 323, 324, 325, 326, 327, 328, 329, 330, 331, 332, 333, 334, 335, 336, 337, 338, 339, 340, 341, 342, 343, 344, 345, 346, 347, 348, 349, 350, 351, 352, 385, 386, 387, 388, 389, 390, 391, 392, 393, 394, 395, 396, 397, 398, 399, 400, 401, 402, 403, 404, 405, 406, 407, 408, 409, 410, 411, 412, 413, 414, 415, 416, 353, 354, 355, 356, 357, 358, 359, 360, 361, 362, 363, 364, 365, 366, 367, 368, 369, 370, 371, 372, 373, 374, 375, 376, 377, 378, 379, 380, 381, 382, 383, 384, 417, 418, 419, 420, 421, 422, 423, 424, 425, 426, 427, 428, 429, 430, 431, 432, 433, 434, 435, 436, 437, 438, 439, 440, 441, 442, 443, 444, 445, 446, 447, 448, 449, 450, 451, 452, 453, 454, 455, 456, 457, 458, 459, 460, 461, 462, 463, 464, 465, 466, 467, 468, 469, 470, 471, 472, 473, 474, 475, 476, 477, 478, 479, 480, 481, 482, 483, 484, 485, 486, 487, 488, 489, 490, 491, 492, 493, 494, 495, 496, 497, 498, 499, 500, 501, 502, 503, 504, 505, 506, 507, 508, 509, 510, 511, 512}.

It should be noted that, if the coding rate is less than or equal to 7/16, then, for each element in the sub-block interleaving pattern above Sub_Block_N, if it were greater than N, then it will be marked as "Unavailable". For example, it will be marked as "−1".

After that, the sub-channel selection of Polar code will be confined by Sub_Block_N_New. For example, for a coding rate is greater than 7/16, the last N−E=512−270=242 codeword bits after sub-block interleaving will be "0". That is, those sub-channels corresponding to N−E=242 codeword bits will be set as frozen bit "0".

After the encoding is completed (including sub-block interleaving), N codeword bits are written into the first N bits 531 of a circular buffer with length 2N. In one example, according to the Polar code sequence, for the new transmission, numbers of the sub-channels carrying the K information bits are {131, 20, 14, 49, 15, 73, 258, 22, 133, 36, 259, 27, 81, 38, 26, 23, 137, 261, 265, 39, 97, 68, 42, 145, 29, 70, 43, 50, 75, 161, 193, 71, 45, 132, 82, 51, 74, 16, 134, 53, 24, 135, 77, 138, 83, 57, 28, 98, 40, 260, 85, 139, 146, 262, 30, 44, 99, 89, 141, 31, 147, 72, 263, 266, 162, 46, 101, 52, 149, 47, 76, 267, 105, 163, 54, 194, 153, 78, 165, 269, 55, 84, 58, 113, 136, 79, 195, 86, 59, 169, 140, 100, 87, 61, 90, 197, 142, 102, 148, 177, 143, 32, 201, 91, 264, 150, 103, 106, 164, 93, 48, 268, 209, 151, 154, 166, 107, 56, 114, 155, 80, 270, 109, 225, 167, 196, 60, 170, 115, 157, 88, 198, 117, 171, 62, 178, 92, 199, 173, 121, 202, 63, 144, 104, 179, 94, 203, 108, 181, 152, 210, 95, 205, 156, 211, 110, 185, 116, 168, 226, 158, 111, 118, 213, 172, 227, 217, 159, 119, 174, 122, 200, 180, 229, 175, 123, 204, 64, 182, 233, 125, 206, 183, 212, 186, 241, 207, 96, 214, 187, 228, 112, 215, 189, 218, 230, 160, 120, 219, 231, 234, 176, 124, 221, 184, 235, 126, 242, 208, 188, 237, 127, 243, 245, 190, 216, 220, 232, 249, 191, 222, 236, 223, 238, 244, 239, 246, 128, 192, 247, 250, 251, 253, 224, 240, 252, 248, 254, 255, 256}. The above sub-channels are arranged according to their reliabilities, from worst reliability to best reliability. Other sub-channels are set to frozen bit "0". The transmitting end transmits the E=270 codeword bits in the first half of the circular buffer after the sub-block is interleaved.

For retransmission, P=43 bits from sub-channels with the worst sub-channel reliability are copied from the newly transmitted K information bits, and put into the retransmission data to transmit through the Polar code 520, as shown in the upper part of FIG. 5. In one example, the P worst reliability sub-channels have numbers of {131, 20, 14, 49, 15, 73, 258, 22, 133, 36, 259, 27, 81, 38, 26, 23, 137, 261, 265, 39, 97, 68, 42, 145, 29, 70, 43, 50, 75, 273, 161, 289, 193, 71, 45, 132, 82, 51, 74, 16, 134, 53, 24}, arranged according to their reliabilities, from worst reliability to best reliability The retransmission may use the same encoding scheme as the new transmission. Here, the retransmission also uses the shortening scheme. That is, the new transmission and the retransmission use the same sequence, the same sub-block interleaving, and the same puncturing pattern. Then, during retransmission, numbers of the sub-channels carrying P information bits are {120, 219, 231, 234, 176, 124, 221, 184, 235, 126, 242, 208, 188, 237, 127, 243, 245, 190, 216, 220, 232, 249, 191, 222, 236, 223, 238, 244, 239, 246, 128, 192, 247, 250, 251, 253, 224, 240, 252, 248, 254, 255, 256} arranged according to their reliabilities, from worst reliability to best reliability. Other sub-channels are set to frozen bits "0".

After the encoding for retransmission is completed (including sub-block interleaving), a XOR operation (or modulo 2 addition) may be performed on the encoded data with respect to the newly transmitted N codeword bits to obtain N codeword bits after the exclusive OR operation. Then, the N codeword bits are written into the second N bits 532 of the circular buffer with length 2N, as shown in FIG. 5.

The transmitting end transmits E=270 codeword bits stored in the latter half of the circular buffer after XOR. The receiving end decodes the new transmission. If the decoding is unsuccessful, the receiving end waits for the transmitter to retransmit data. The receiving end concatenates the retransmitted data with the newly transmitted data for decoding. After receiving the E=270 data, the receiving end will initialize the N−E=512−270=242 data that has not been transmitted into +10000 to obtain N=512 data. Then the retransmitted data and the newly transmitted data are concatenated to become 2N=2*512=1024 data to be decoded, wherein the first half N data are retransmitted data and the second half N data are newly transmitted data. During the decoding of the 2N data, the bits decoded from the first half N data are used to replace (or combine) the bits copied from the new transmission. In one embodiment, a box-plus may be performed on the received retransmitted data and the received newly transmitted data without a concatenation of the two data, to obtain a first half data corresponding to the retransmission and a second half data corresponding to the new transmission. The bits copied from the new transmission are then replaced (or combined) with the bits decoded from the first half data.

Figure 17:
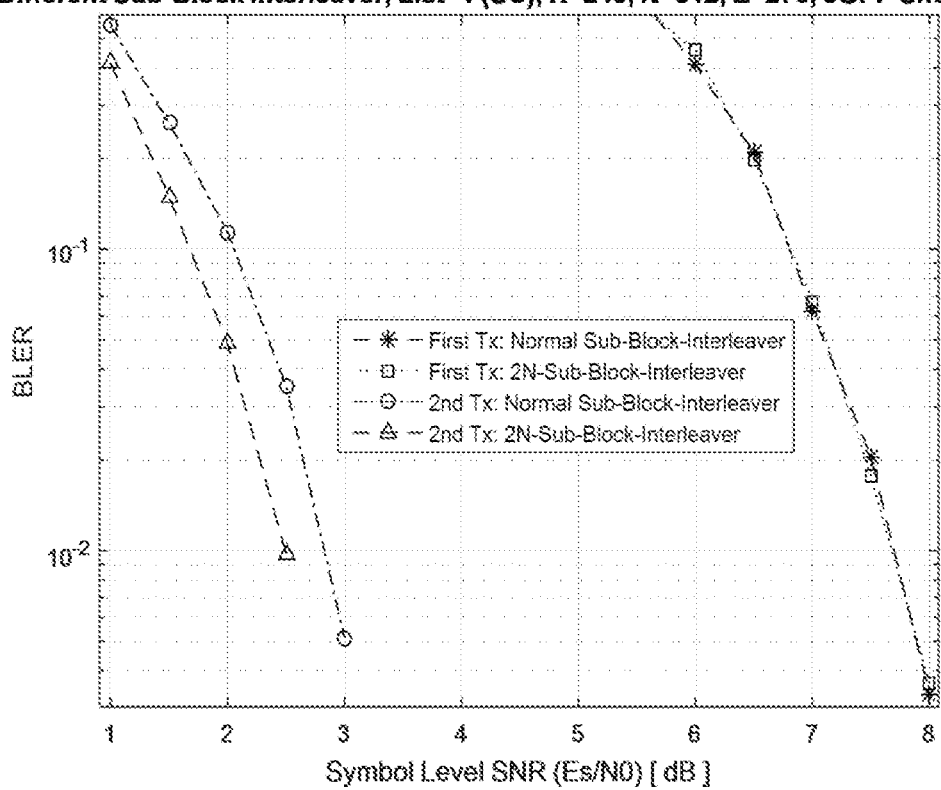
FIG. 17 illustrates still another comparison of exemplary BLER performances of various encoding methods, in accordance with some embodiments of the present disclosure.

FIG. 17 illustrates another comparison of exemplary BLER performances of various encoding methods, in accordance with the second embodiment. As shown in FIG. 17, after using the above method in the eighth embodiment (the line marked with "▲" and labeled as "2nd Tx: 2N-Sub-Block-Interleaver" in FIG. 17), it can achieve a gain of 0.31 dB (read at BLER=1%, under AWGN channel model) compared to the method used in the first embodiment (the line marked with "○" and labeled as "2nd Tx: Normal Sub-Block-Interleaver" in FIG. 17). At the same time, it can be seen that the performance for the new transmission (the first transmission) is not affected.

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand exemplary features and functions of the present disclosure. Such persons would understand, however, that the present disclosure is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any of the above-described exemplary embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A person of ordinary skill in the art would further appreciate that any of the various illustrative logical blocks, modules, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software module), or any combination of these techniques.

To clearly illustrate this interchangeability of hardware, firmware and software, various illustrative components, blocks, modules, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, module, etc. can be configured to perform one or more of the functions described herein. The term "configured to" or "configured for" as used herein with respect to a specified operation or function refers to a processor, device, component, circuit, structure, machine, module, etc. that is physically constructed, programmed and/or arranged to perform the specified operation or function.

Furthermore, a person of ordinary skill in the art would understand that various illustrative logical blocks, modules, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, modules, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein.

If implemented in software, the functions can be stored as one or more instructions or code on a computer-readable medium. Thus, the steps of a method or algorithm disclosed herein can be implemented as software stored on a computer-readable medium. Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "module" as used herein, refers to software, firmware, hardware, and any combination of these elements for performing the associated functions described herein. Additionally, for purpose of discussion, the various modules are described as discrete modules; however, as would be apparent to one of ordinary skill in the art, two or more modules may be combined to form a single module that performs the associated functions according embodiments of the present disclosure.

Additionally, memory or other storage, as well as communication components, may be employed in embodiments of the present disclosure. It will be appreciated that, for clarity purposes, the above description has described embodiments of the present disclosure with reference to different functional units and processors. However, it will be apparent that any suitable distribution of functionality between different functional units, processing logic elements or domains may be used without detracting from the present disclosure. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of this disclosure. Thus, the disclosure is not intended to be limited to the implementations shown herein, but is to be accorded the widest scope consistent with the novel features and principles disclosed herein, as recited in the claims below.

The invention claimed is:

1. A method for wireless communication, comprising:
   selecting a coding scheme between a first coding scheme and a second coding scheme, wherein the first coding scheme is based on a first Polar code, wherein the second coding scheme is based on the first Polar code and a second Polar code;
   encoding an information packet based on the coding scheme; and
   transmitting the encoded information packet;
   wherein for the second coding scheme:
      P bits to be encoded in the second Polar code are copied from P bits in the first Polar code;
      the P bits in the first Polar code correspond to data carried by P sub-channels with worst reliability; and
      the P bits to be encoded in the second Polar code correspond to data carried by P sub-channels with best reliability.

2. The method of claim 1, wherein the coding scheme is selected based on a code rate.

3. The method of claim 1, wherein the coding scheme is selected to be:
   the first coding scheme under a condition that a code rate is greater than or equal to a code rate threshold; or
   the second coding scheme under a condition that a current redundancy version is a second redundancy version RV 1.

4. The method of claim 1, wherein the coding scheme is selected to be the second coding scheme, and encoding the information packet comprises:
   encoding the information packet based on the first Polar code to generate a first output;
   encoding the information packet based on the second Polar code to generate a second output; and
   performing a modulo-2 addition operation or an exclusive OR operation on the first output and the second output to obtain a codeword.

5. The method of claim 4, wherein encoding the information packet further comprises at least one of:
   concatenating the codeword with the first output to generate the encoded information packet;
   concatenating the codeword with the second output to generate the encoded information packet; or
   concatenating the first output with the second output to generate the encoded information packet.

6. The method of claim 1, wherein when a current transmission is a third transmission or a fourth transmission, a set of numbers of sub-channels carrying the copied bits is a subset of a set of numbers of codeword bits of the third transmission.

7. The method of claim 1, wherein when a current transmission is a third transmission or a fourth transmission, a set of numbers of sub-channels carrying the copied bits is a subset of a set of numbers of codeword bits of the third transmission.

8. The method of claim 1, wherein encoding the information packet comprises:
   generating a codeword with a length 2N at one time, wherein N is a mother code length of the first Polar code and the second Polar code.

9. The method of claim 8, wherein generating the codeword comprises:
offsetting an original sequence with a length N by N to generate an offset sequence; and
concatenating the offset sequence with the original sequence to generate the codeword with the length 2N.

10. The method of claim 8, wherein P bits in a first half of the information packet to be encoded are same as P bits in a second half of the information packet to be encoded, or wherein a sub-block interleaving pattern used in a first half of the codeword with the length 2N becomes a sub-block interleaving pattern used in a second half of the codeword after an offset N.

11. A method for wireless communication, comprising:
receiving an encoded information packet;
decoding the encoded information packet based on at least one Polar code, wherein decoding the encoded information packet comprises:
decoding a first part of the encoded information packet to obtain first decoded data, and
decoding a second part of the encoded information packet to obtain second decoded data, wherein decoding the second part comprises updating the second decoded data based on the first decoded data, wherein updating the second decoded data comprises:
based on a determination that the first decoded data represent a hard bit "0", replacing a log likelihood ratio of the second decoded data with an absolute value of the log likelihood ratio itself; and
based on a determination that the first decoded data represent a hard bit "1", replacing the log likelihood ratio of the second decoded data with a negative absolute value of the log likelihood ratio itself.

12. The method of claim 11, wherein the first decoded data corresponds to data on sub-channels of a retransmission or corresponds to data on sub-channels of a second transmission.

13. The method of claim 11, wherein the second decoded data corresponds to data copied from sub-channels of a new transmission, or corresponds to data copied from sub-channels of a second transmission.

14. The method of claim 11, wherein the first decoded data and the second decoded data comprise: hard bits, log likelihood ratio, and decoding probability.

15. The method of claim 11, wherein the updating the second decoded data comprises:
replacing values of hard bits of the second decoded data or a log likelihood ratio of the second decoded data with values of hard bits of the first decoded data, or with a log likelihood ratio of the first decoded data, respectively.

16. The method of claim 11, wherein the updating the second decoded data comprises:
replacing a decoding probability of the second decoded data with a decoding probability of the first decoded data.

17. The method of claim 11, wherein the updating the second decoded data comprises:
adding, according to a certain proportion, a log likelihood ratio of the second decoded data and a log likelihood ratio of the first decoded data to generate a sum; and
replacing the log likelihood ratio of the second decoded data with the sum;
based on a determination that the first decoded data represent a hard bit "0", replacing a log likelihood ratio of the second decoded data with an absolute value of the log likelihood ratio itself; or
based on a determination that the first decoded data represent a hard bit "1", replacing the log likelihood ratio of the second decoded data with a negative absolute value of the log likelihood ratio itself.

18. A wireless communications apparatus comprising a processor and a memory, wherein the processor is configured to read code from the memory and implement a method comprising:
selecting a coding scheme between a first coding scheme and a second coding scheme, wherein the first coding scheme is based on a first Polar code, wherein the second coding scheme is based on the first Polar code and a second Polar code;
encoding an information packet based on the coding scheme; and
transmitting the encoded information packet,
wherein for the second coding scheme:
P bits to be encoded in the second Polar code are copied from P bits in the first Polar code;
the P bits in the first Polar code correspond to data carried by P sub-channels with worst reliability; and
the P bits to be encoded in the second Polar code correspond to data carried by P sub-channels with best reliability.

19. A wireless communications apparatus comprising a processor and a memory, wherein the processor is configured to read code from the memory and implement a method comprising:
selecting a coding scheme between a first coding scheme and a second coding scheme, wherein the first coding scheme is based on a first Polar code, wherein the second coding scheme is based on the first Polar code and a second Polar code;
encoding an information packet based on the coding scheme; and
transmitting the encoded information packet;
wherein for the second coding scheme:
P bits to be encoded in the second Polar code are copied from P bits in the first Polar code;
the P bits in the first Polar code correspond to data carried by P sub-channels with worst reliability; and
the P bits to be encoded in the second Polar code correspond to data carried by P sub-channels with best reliability.

* * * * *